DATA COMMUNICATION SYSTEM

INVENTORS.
CARL B. CARLSON
RICHARD S. SHARP
JAMES E. WOLLUM
BY Christie, Parker & Hale
ATTORNEYS.

June 25, 1968 C. B. CARLSON ET AL 3,390,379

DATA COMMUNICATION SYSTEM

Filed July 26, 1965 18 Sheets-Sheet 8

INPUT MULTI CHARACTER CONTROL CODE RECOGNITION

United States Patent Office 3,390,379

Patented June 25, 1968

3,390,379

DATA COMMUNICATION SYSTEM

Carl B. Carlson, Arcadia, Richard S. Sharp, Sierra Madre, and James E. Wollum, Duarte, Calif., assignors to Burroughs Corporation, Detroit, Mich., a corporation of Michigan Filed July 26, 1965, Ser. No. 474,649
19 Claims. (Cl. 340—172.5)

ABSTRACT OF THE DISCLOSURE

A data communication system having an improved data transmission terminal unit intermediate a data processor and peripheral units of differing types. The terminal unit includes a buffer memory which is divided into a plurality of equal segments, logical circuitry to effectuate buffer control and a number of line adaptors equal to the number of peripheral units. A uniform interface is provided between the buffer control circuitry and each line adaptor and, by accommodating each peripheral unit to this uniform interface, the line adaptors enable a single buffer memory and a single buffer control unit to be used in conjunction with many different types of peripheral units. Moreover, each peripheral unit is associated with a particular segment of the buffer memory and the processor may initiate a communication with a particular one of the peripheral units by addressing that segment of buffer memory associated with the selected peripheral unit.

This invention relates to data communication systems and, more particularly, to such systems having the ability to connect a data processor to a variety of remote systems by means of a single terminal unit and in which communication between the processor and the systems may be initiated either by the remote systems or by the processor.

In modern data communication systems, it is often advantageous to enable data systems located at a number of remote stations to communicate with the same data processor. The data systems at the remote stations may be of different types such as, for example, typewriter stations, Teletype networks, paper tape punches and readers, or other data processing systems. Furthermore, the remote data stations may be connected to the data processor in any of a number of different ways such as by a leased telephone line, a telephone exchange, or over a private two-wire line. It is thus apparent that the data presented to the data processor from such stations will necessarily be subject to idiosyncracies both of the various types of data stations and the various means by which they are connected to the processor. Use at such stations of equipment made by different manufacturers will produce additional idiosyncracies in the nature of the data presented to the processor. Thus, for example, such data will be presented in various formats, in different codes, and subject to different timing and control requirements.

Buffer memories are used to facilitate the transfer of information between a central processor and peripheral input/output units. Means must be provided to accommodate information transfer between the buffer and the processor and between the buffer and the peripheral units. Where such peripheral units are located near the processor and have been designed to function in combination with the processor, the provision of such means entails little difficulty. In many data communication systems, however, these prerequisites are not met and considerable problems are engendered in accommodating such transfer of information.

The means for accommodating such information transfer is made up largely of logical circuitry known as "buffer control" circuitry. Since such buffer control circuitry must transfer to the buffer memory information received from a number of independent peripheral units and must transfer from the buffer memory information transmitted to the peripheral units, it is highly advantageous to have signals of a uniform nature presented to the buffer control circuitry, and received from the buffer control circuitry, regardless of the particular peripheral unit involved.

Some prior art data communication systems provide a plurality of terminal units intermediate the processor and the peripheral units. Each such terminal unit includes a separate buffer memory and buffer control circuitry. Multiplexing means are provided to accommodate the plurality of terminal units to the data processor. Each terminal unit has associated therewith only peripheral units which are of identical type. Since each buffer memory and its associated buffer control circuitry receive information from, and transmit information to, peripheral units of identical type, the problems attendant to the accommodation of peripheral units of different type do not arise. These systems have the practical disadvantage of being high cost systems, however. A separate and relatively expensive terminal unit, including a buffer memory and control circuitry, must be provided for each type of peripheral unit used in the system.

An advantage of the present invention is that it enables different types of peripheral units to be coupled to a data processor by means of a single terminal unit.

Another advantage of the present invention is that it enables a single buffer memory and buffer control circuit to receive information from, and transmit information to, peripheral units of various types.

In some prior art data communication systems in which a plurality of terminal units are utilized to connect various types of peripheral units to a data processor, the processor is not able to initiate communications with particular ones of the peripheral units. These systems operate solely on an inquiry basis. A peripheral unit can initiate an inquiry and the processor will respond by furnishing a reply to that peripheral unit.

Another advantage of the present invention is that it enables either the peripheral units or the processor to initiate communications.

The buffer memory in which characters are stored intermediate their transfer between a data processor and peripheral units will advantageously be of different size for different types of peripheral units. Thus, for example, a buffer associated with a card reader will advantageously be able to store at least eighty characters while buffers associated with other types of units may be most advantageously of a different size.

Another advantage of the present invention is that a varying number of buffer memory segments may be associated with the different types of peripheral units thereby effectuating buffers of differing sizes for the peripheral units.

It sometimes is desirable to associate two or more separate buffer memories with a single peripheral unit. Speed advantages can thereby be achieved since one buffer may then be loaded from the peripheral unit while the other is being unloaded into the processor.

Another advantage of the present invention is that two or more buffer segments may be associated with a peripheral unit in a manner to effect separate buffer memories associated with that unit.

All of the preceding advantages are realized by the present invention which provides a data communication system having an improved data transmission terminal unit intermediate a data processor and peripheral units of differing types.

The terminal unit includes a buffer memory, logical circuitry to effectuate buffer control, and a number of line adaptors equal to the number of peripheral units. The buffer memory is divided into a plurality of equal segments. Each peripheral unit is associated via its line adaptor to one or more of the buffer segments. Where a number of buffer segments are associated with a single line adaptor, means are provided whereby the segments may be combined to operate as a single multiple-segment buffer. Alternatively, a plurality of buffer segments associated with the same adaptor may operate independently of one another thereby enabling one such segment to be loaded with information while another is being unloaded.

The line adaptors enable the buffer control circuitry to control the transmission of information between the buffer memory and the peripheral units by rendering the different types of peripheral units compatible with the buffer control circuitry. The buffer control circuitry presents information to the adaptors and receives it from the adaptors in a manner independent of the particular type of peripheral unit involved. A uniform interface is provided between the buffer control circuitry and each line adaptor. By accommodating each peripheral unit to this uniform interface, the line adaptors enable a single buffer memory and a single buffer control circuit to be used in conjunction with many different types of peripheral units.

Since each segment of buffer memory is associated with a particular one of the peripheral units, the processor may initiate a communication with a particular one of the peripheral units by addressing that segment of buffer memory associated with the selected peripheral unit. A first register controls the buffer segment receiving attention from the buffer control circuitry at any given time. A second register provides temporary storage of the address of a first buffer segment selected by the processor whenever the address of a second buffer segment associated with an adaptor ready for attention must be stored in the first register prior to completion of the message from the processor to the peripheral unit associated with the first buffer segment.

The manner of operation of the present invention and the manner in which it achieves the above and other advantages may be more clearly understood by reference to the following detailed description when considered with the drawing in which.

Figure 1:
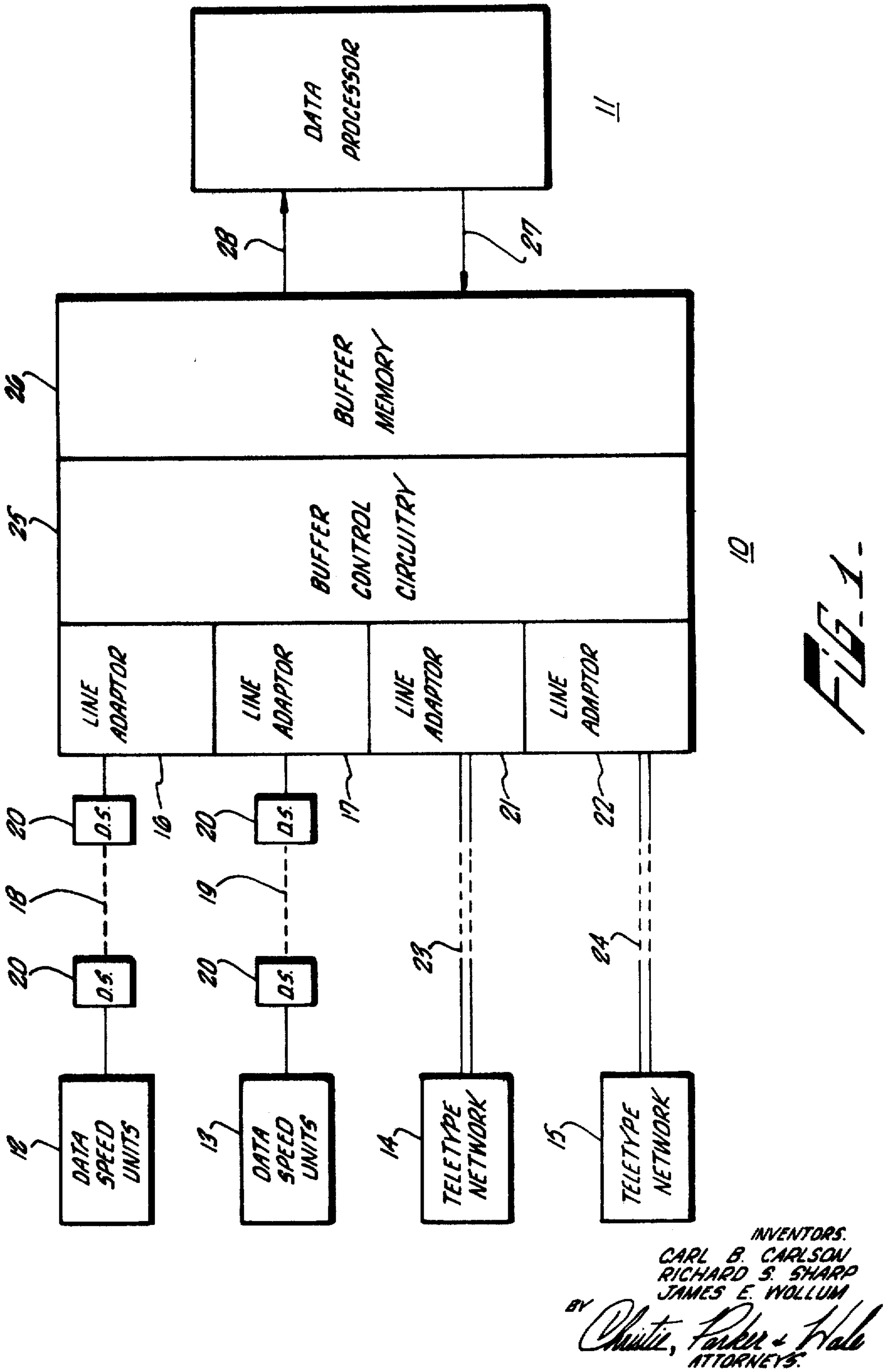
FIG. 1 depicts a block diagram of the data transmission terminal unit of the present invention.

FIG. 1 depicts a block diagram of data transmission terminal unit 10 positioned intermediate data processor 11 and a number of peripheral units located at remote stations. Four typical peripheral units are shown, namely dataspeed units 12 and 13 and Teletype networks 14 and 15. The dataspeed units include punches and tape readers and are available from the telephone company. The units are connected to line adaptors 16 and 17 via telephone lines 18 and 19 and data sets 20 located at each end of the telephone lines. The data sets may be, for example, Model 202 also available from the telephone company.

Teletype networks 14 and 15 are connected to line adaptors 21 and 22 by Teletype lines 23 and 24. Each of the Teletype networks 14 and 15 includes a number of Teletype units such as, for example, Model 28 available from the Teletype Corporation. Each of the adaptors 16, 17, 21, and 22 of terminal unit 10 is connected to buffer control circuitry 25 by a uniform interface. Buffer control circuitry 25 in turn controls the storage and removal of information in buffer memory 26. Messages are received by buffer memory 26 from data processor 11 over lines 27 and are transmitted to data processor 11 from buffer memory 26 via lines 28.

In operation, messages may be initiated by any of the peripheral units 12–15 stored temporarily in buffer memory 26 and then transmitted to processor 11 by line 28. Additionally, messages from processor 11 may be transmitted to buffer memory 26 via lines 27 and subsequently transmitted to any one of the peripheral units. The buffer memory is divided into segments with each segment being associated with one of the peripheral units 12–15 and each segment being addressable either by its associated peripheral unit or by the processor itself. Since the processor 11 as well as the peripheral units may address the memory 26, the system shown in FIG. 1 enables the processor to initiate communications with the peripheral units as well as to respond to inquires initiated by the peripheral units.

Since the buffer control circuitry 25 presents a uniform interface to each of the line adaptors 16, 17, 21, and 22, the adaptors by accommodating their associated peripheral units to this interface, render different types of peripheral units compatible with the single buffer control circuit 25 and buffer memory 26. Although line adaptors for only two different types of peripheral units are shown in FIG. 1 and discussed in detail hereinafter, line adaptors may be designed to render many additional types of peripheral units compatible with buffer control circuitry 25 and buffer memory 26.

Figure 2:
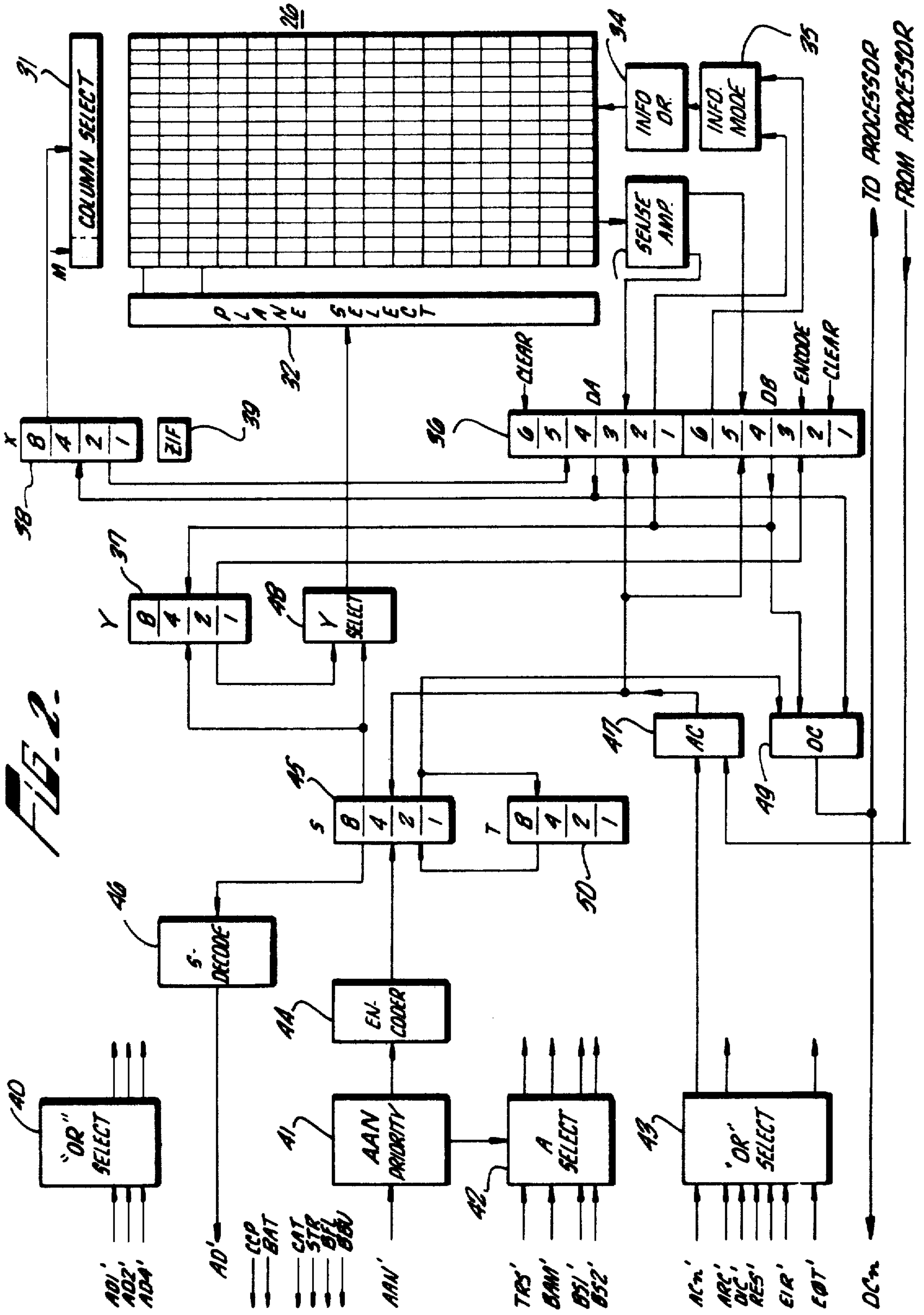
FIG. 2 depicts in more detailed block diagram form the buffer memory and buffer control circuitry shown in FIG. 1.

FIG. 2 depicts a block diagram which sets forth buffer memory 26 and buffer control circuitry 25 in greater detail than shown in FIG. 1 along with the signal lines making up the uniform interface between the buffer control circuitry 25 and each of the line adaptors.

As shown in FIG. 2, the buffer memory comprises a magnetic core memory which is divided into 16 segments with each of the 16 segments having 16 12-bit word locations. The first two of the 16 word locations of each segment are reserved for control purposes leaving the remaining 14 locations in memory available for the storage of information characters. Two 6-bit characters may be stored in each of the word locations. Conventional column select drivers 31, plane select drivers 32, sense amplifiers 33, information drivers 34 and information mode selection circuitry 35 is associated with buffer memory 26 and operate in a standard manner.

Memory information register 36 comprises 12 flip-flop circuits and is sometimes referred to herein as the D-register. This register is divided into two halves referred to herein as the DA-register and DB-register. Additional flip-flop registers 37, 38, and 39 comprise the memory address register and are often referred to herein as the Y, X, and Z registers, respectively. The Z register controls the addressing of the upper or lower character in each word location, the X register controls the addressing of the particular word location within a particular segment of the memory, while the Y register controls the addressing of the selected segment of the buffer memory.

All of the arrows shown at the left of FIG. 2 indicate the signal lines which make up the uniform interface between buffer control circuitry 25 and each of the line adaptors. Those arrows pointed toward the right in FIG. 2 indicate signals received by the control circuitry from the adaptors, while those arrows pointing to the left in FIG. 2 indicate signals transmitted by the buffer control circuitry to the adaptors. Each of the lines is considered to be in the logical "true" condition whenever a signal appears on the line and in the logical "false" condition in the absence of such a signal. Each line is accompanied by initials which designate the significance of signals appearing on the line. Some of the lines are accompanied by initials having an apostrophe, or "primed" indications appended thereto which in accordance with usual conventions indicates that such a line will be "true" whenever the line accompanied by the same initials without an apostrophe is "false" and vice versa.

Each adaptor has its own lines on which it can send signals to the buffer control circuitry. FIG. 2 shows only the lines from one adaptor but in actuality there are lines from each adaptor. Thus, there will exist an AAN'–00 line from the adaptor arbitrarily designated as 00, an AAN'–01 line from the adaptor arbitrarily designated as 01, etc.

A first group of the interface lines shown in FIG. 2 are AD1', AD2', and AD4' which are Adaptor Description lines. These lines transmit signals from an adaptor to "OR" select circuitry 40. The adaptor description lines indicate to the buffer control circuitry the particular type of adaptor from which these lines come for the purpose of modifying the operation of the buffer control circuitry to accommodate idiosyncracies of the adaptor. Thus, for example, the buffer control circuitry uses signals appearing on these lines to control whether a particular adaptor transmits and receives characters made up of eight bits or of ten bits.

The next line of the interface shown in FIG. 2 is accompanied by the initials AD' and is the Adaptor Designate Line. This line transmits a signal from the buffer control circuitry to the adaptor which has been designated by selection circuitry within the buffer control. When so designated, the adaptor can respond to buffer control signals received in the adaptor, and the adaptor can transmit many of its own signals to the buffer control.

The next line shown is accompanied by the initials AAN' and is the Adaptor Attention-Needed "Not" Line. The AAN' line from each of the adaptors is connected to priority circuitry 41. Signals on these lines are transmitted from the adaptors to the buffer control and priority circuitry 41 selects the lowest numbered one of those adaptors needing attention. Since these lines are primed, they indicate that attention is needed by their associated adaptors when in the "false" condition and that attention is not needed by their associated adaptors when they are in the "true" condition.

The next four lines of the interface shown in FIG. 2 are connected to selection circuitry 42, and transmit signals from the adaptor to selection circuitry 42. TRS' is the Transmit "Not" line and when "true" indicates that a particular adaptor is in the "not transmit" or "input" state. BAM' is the Bit Access Mode "Not" line and when "true" indicates that a particular adaptor is in the "character access mode" rather than the "bit access mode." BS1' and BS2' stand for Buffer Select Bit lines 1 and 2, respectively, and when "true" indicate which buffer segment is to be used to store information received from the adaptor.

The next group of interface lines are connected to selection circuitry 43 and transmit signals from the adaptors to this selection circuitry. AC*n* represents a number of lines from each adaptor. When information is transmitted to the buffer memory 26 from an adaptor a bit at a time, these bit signals will appear on only one of the AC lines. When all of the bits of an entire character are transmitted simultaneously from an adaptor, signals will appear on all of the AC lines. ARC' is the Adaptor Replace Character "Not" line; DIC' is the Discard Character "Not" line; RES' is the Reset "Not" line; EIR' is the End of Input Recognized "Not" line; and EOT' is the End of Output Total "Not" line.

The remaining lines of the interface which are shown in FIG. 2, as well as the AD line, represent control signals which are transmitted from the buffer control circuitry to the adaptors. CCP is the Clock Pulse line, and represents 100 kc. pulses which are used throughout the system. BAT is the Bit Access Time line; CAT is the Character Access Time line; STR is the Start Transmission line; BFL is the Buffer Full line; and BBU is the Buffer Busy line.

The next line of the interface shown in FIG. 2 is accompanied by the initials DC*n*. This line represents a number of lines to each adaptor which transmit information signals from the buffer memory to the adaptors.

Operation of the system shown in FIG. 2 will now be briefly discussed.

A false condition on one of the AAN' lines indicates that the adaptor associated with the particular line needs attention. The priority of adaptors needing attention is determined by priority circuitry 41 and encoding circuitry 44 then encodes the number of the selected adaptor and transmits this number to S-register 45. The number of the selected adaptor is decoded by decoding circuitry 46 and a signal appears on that AD line associated with the one adaptor which has been designated by priority circuit 41. Simultaneously with the selection of the designated adaptor by priority circuit 41, a signal is transmitted from circuitry 41 to selection circuitry 42. This signal enables circuitry 42 to transmit signals which indicate the condition of the designated adaptor. The signals transmitted by selection circuitry 42 denote whether the designated adaptor is in the input or output state, whether it is operating in bit access mode or character access mode and whether it has more than one independent buffer memory segment associated with it.

While selection circuitry 42 performs its selecting prior to the setting of selection register 45, selection circuits 40 and 43 do their selecting after the selection register 45 has been set and utilize the Adaptor Designate Line of the designated adaptor in performing their selection.

Assume, for example, that the designated adaptor is in the input state. The designated adaptor will then send bits of a message received from a peripheral unit to the buffer memory 26. If the adaptor is operating in bit access mode it will transmit these bits one at a time on one of the AC lines to the buffer control circuitry. Each of these bits will be transmitted by AC switch 47 to information register 36 and subsequently into buffer memory 26, with this operation being identified by a Bit Access Time Signal.

The S-register 45 designates the adaptor which has been selected and also provides the plane select signals for the buffer memory 26. It thus connects the chosen adaptor to its associated row within buffer memory 26. Since it is possible for an adaptor to be associated with more than one independent segment of buffer memory 26, this condition is controlled by signals on the BS1 and BS2 lines. The actual selection of one of the rows within buffer memory 26 is controlled by selection circuitry 48 which in turn is controlled by the values stored in both selection register 45 and Y register 37. Signals on the BS1 and BS2 lines are utilized to enable selection circuitry 48 to provide signals to a row of buffer memory 26 other than that row which would be selected as a result of the initial value stored in selection register 45 by encoding circuitry 44. As a consequence, information being received from the selected adaptor may be stored in one row of the buffer memory while information previously received from the adaptor is being transmitted to the processor from another row of the buffer memory.

As information bits are received on the AC line at each bit access time, these bits must be temporarily stored and assembled into characters prior to their subsequent storage in the proper character location in the buffer memory 26. As stated previously, each row or segment of the buffer memory has two word positions in memory which are utilized for control purposes. These are shown in FIG. 2 as the first two positions within each row of the memory. The first position is an address storage position and the second position is an input/output storage position. As each bit is received from the adaptor, it is initially stored in the input/output position of the memory row associated with the designated adaptor. A character is assembled in the input/output position in a manner which was described in the copending application of Richard S. Sharp, Ser. Number 386,552, filed July 31, 1964, and assigned to the assignee of the present application.

After a character is fully assembled, a character access time signal is sent to the adaptor from the buffer control circuitry subsequent to each character sent to the buffer memory. At character time, a completed character has been assembled in the input/output section of the proper memory row and is ready to be transferred into the proper character position within that row. The proper character position into which the character is to be stored is designated by a value in the address control location of the memory row. At each character time, the character assembled in the input/output section is therefore stored in the character position of the memory as determined by the value stored in the address control location. The value stored in the address control location is increased by one after each storage of an assembled character.

In the normal situation, characters sent from the adaptor to the buffer will be assembled and stored within the buffer until the buffer segment associated with that adaptor has become completely filled. At this time a signal will appear on the BFL line to indicate to the adaptor that the buffer is full and the information stored in the buffer is identified as being ready to be transmitted to the processor. Information transferred to the processor is also achieved in a manner similar to that described in the aforesaid copending application. The information is read out of buffer memory back into the D information register 36 and thence via DC switching circuit 49 to the processor.

It is sometimes necessary, however, that information stored in the buffer memory 26 be sent to the processor before the particular memory segment has become full. Particular characters called group marks are recognized by the adaptor and cause the storage and transfer of messages to depart from the normal procedure. At each character access time, when a character has been assembled in the input/output section of a particular buffer memory segment, the assembled character also appears in D-register 36. DC switching circuit 49 operates to present the assembled character on the DC lines to the designated adaptor. Recognition circuits within the adaptor recognize particular characters which have been assembled and, upon such recognition, effectuate modifications in the normal operation of the system. Thus, if the adaptor recognizes that the end of an input message has occurred, it will provide a signal on the EIR′ line and as a result the information stored thus far in the buffer segment associated with the designated adaptor will be transferred to the processor even though the buffer segment had not been filled.

If the adaptor recognition circuitry recognizes the assembled character as one which should not be stored in buffer memory 26 but which should be replaced by a different character, the adaptor will provide a signal on the ARC line and will provide the replacement character on the AC lines. The replacement character will then be stored in the information register 36 and subsequently into the proper character position in buffer memory 26.

If the adaptor recognition circuitry determines that the assembled character should be discarded and not stored, it will provide a signal on the DIC′ line and as a result the assembled character will not be stored in buffer memory 26.

If the adaptor recognition circuitry recognizes a character which indicates that the buffer is to be cleared, it will provide a signal on the RES′ line and as a result succeeding characters will be stored in the buffer memory segment starting over again in the first information position.

The manner in which information characters are transferred to the adaptor from buffer memory 26 is similar to that in which the characters are received by the buffer from the adaptor. In this case, the designated adaptor will be in the transmit mode and its TRS′ line will be false. Information stored in character locations of buffer memory 26 are transferred to the input/output section and thence transferred a bit at a time via information register 36, DC switching circuitry 49 and one of the DC lines to the adaptor. In this phase of operation too, the adaptor must recognize particular characters prior to their transmission on the DC lines.

Ordinarily, information will be transferred from buffer memory 26 to the designated adaptor after a particular buffer segment has been filled by the data processor. However, prior to the storage of each assembled character into the input/output location of buffer memory 26, the character is presented to the designated adaptor via the DC lines and recognition circuitry within the adaptor is designed to recognize particular characters. Thus, if the adaptor recognizes a character indicative of the end of the particular message being transmitted, the adaptor will provide a signal on the EDT′ line, information transfer to the adaptor will cease and the buffer will be reset.

In the transmission of information from the processor to the buffer memory 26 and subsequently to a designated adaptor, information from the system may be switched by AC switching circuitry 47 into either the information register 36 or into selection register 45. As a result, the processor is enabled to address a particular segment of buffer memory 26 and thereby to initiate communications with any particular one of the adaptors. This is achieved by transmitting from the processor, via switching circuit 47 and into selection register 45, the address of the particular buffer segment associated with the adaptor with which the processor desires to initiate communication. Hence the processor is not limited to the furnishing of reply messages to a particular adaptor in response to inquiries made by that particular adaptor. Rather, by inserting into selection register 45 the address of a buffer segment selected by the processor, the processor is no longer limited to communication with that buffer segment whose address was previously set into register 45 by an adaptor initiating an inquiry.

The ability of signals on the BS1 and BS2 lines to enable two or more independently operating buffer segments to be associated with a single line adaptor was previously discussed. Signals on the BS1 and BS2 lines enable the Y selection circuitry 48 to point to more than one row of the buffer memory, with the row pointed to being determined by the particular signals on the BS1 and BS2 lines. In addition, it is possible for several rows of the buffer memory 26 to be associated with a single line adaptor under circumstances wherein the Y selection circuitry 48 does not always point to the same row of buffer memory. In this latter mode of operation, the several rows of buffer memory associated with the adaptor do not operate independently, but rather combine to form what is effectively a single multi-row buffer segment. Thus, the Y selection circuitry 48 will always point to the same row of buffer memory and the address location section and input/output section of this row will be the only control sections utilized by the adaptor with which this row and one or more succeeding rows are associated. Upon storage of a character in the last character position of this row the next character assembled will be stored in the first character position of the next row. Thus, several rows of buffer memory may be utilized to store information before any of this information is subsequently read out of buffer memory 26.

T register 50 is shown connected to selection register 45. The purpose of register 50 is to store temporarily information previously stored in register 45 and subsequently to return this information to register 45. Thus, for example, if the processor is transmitting information to a particular buffer segment whose address is stored in register 45 and another adaptor suddenly needs attention in order to transmit incoming line information to buffer memory 26, the address in register 45 will be transferred to register 50. The address associated with the adaptor now needing attention will be stored in register 45. The incoming information will be transmitted to the buffer segment associated with the adaptor now needing attention and upon the completion of transmittal of input information from this adaptor, the address now stored in register 50 will be restored in register 45 and the processor will resume the transmittal of information to its selected buffer segment.

Figure 3:
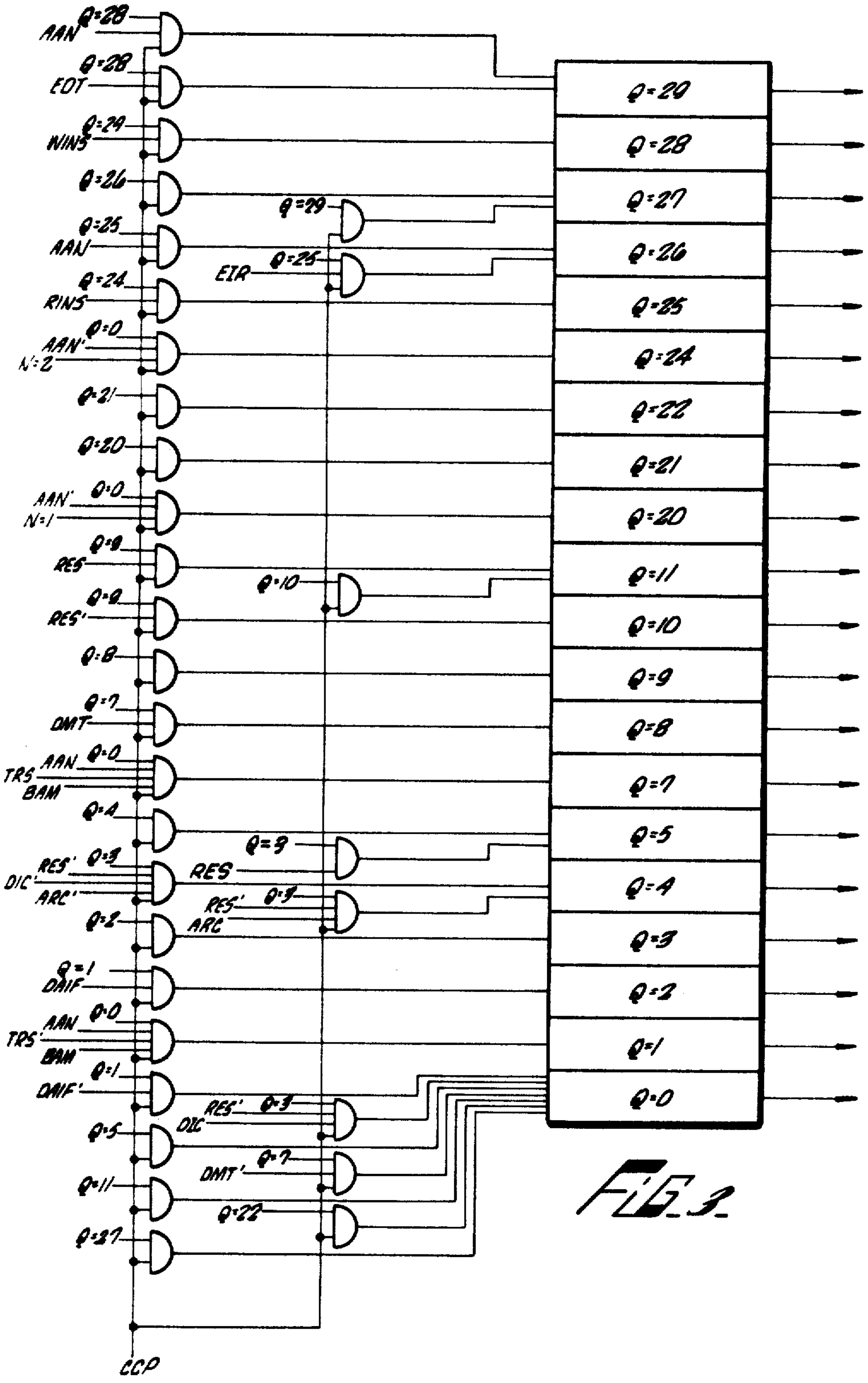
FIGS. 3 through 10 depict various circuitry shown in block diagram form in FIG. 2.

FIG. 3 depicts a control counter which generates a number of signals which designates control states within which particular operations described in connection with succeeding figures wherein means by which operations performed.

The control counter of FIG. 3 may comprise a number of flip-flop circuits. The outputs of these flips-flops will be utilized in connection with the discussion of succeeding Figures wherein means by which operations carried out by the circuitry of FIG. 2 may be performed are described.

Figure 4:
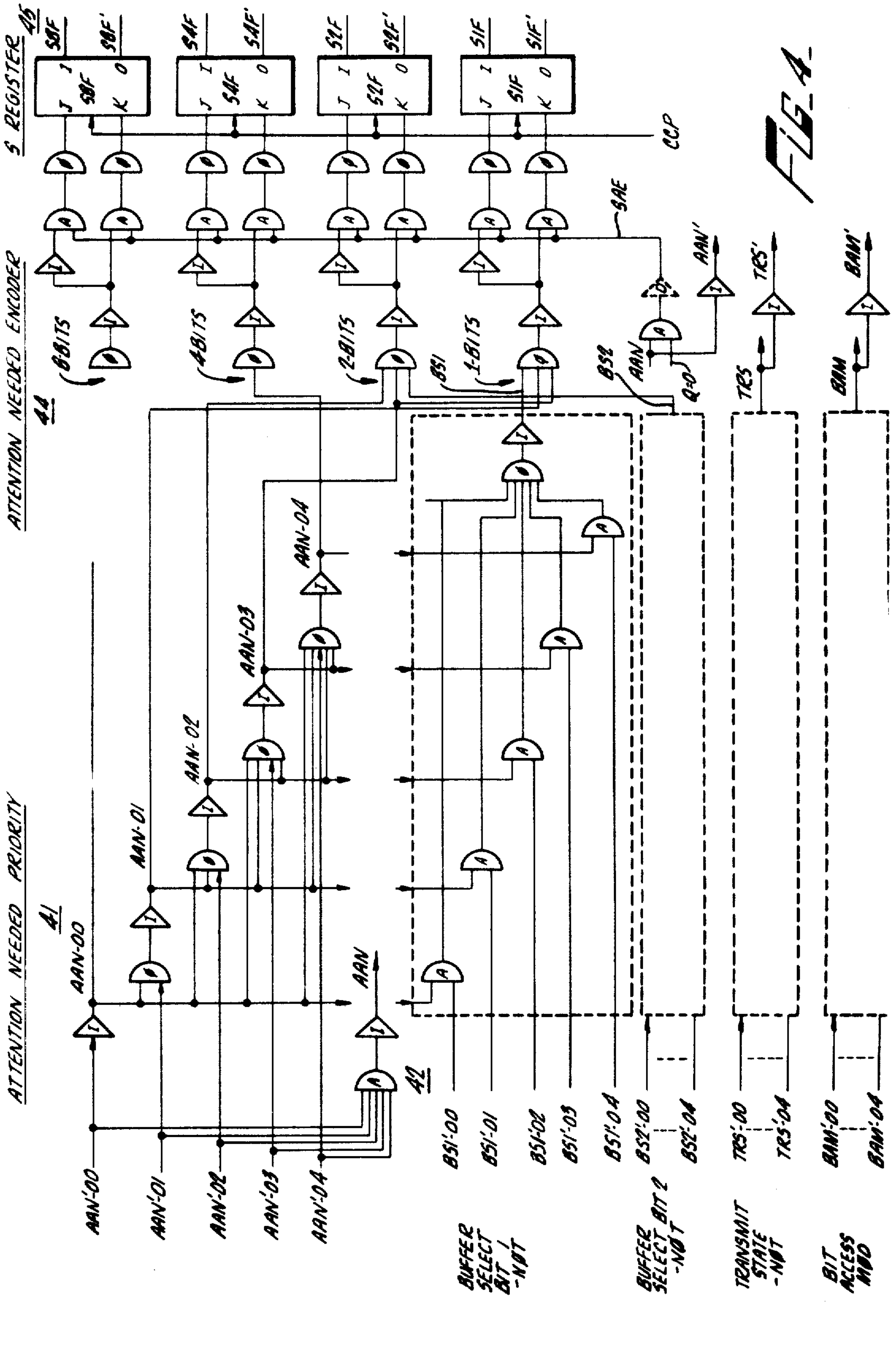

FIG. 4 depicts the attention-needed priority circuits 41, the attention-needed encoder 44, the S-register 45 and the selection circuitry 42, shown in FIG. 2. AAN' lines from several adaptors are shown entering the priority selection circuitry 41. These lines are normally "true" and will become "false" only when the adaptor associated with a particular lines needs attention.

AND gates, OR gates and inverters are all shown in FIG. 4 with AND gates being designated by semi-circles with "A's" enclosed, OR gates being designated by semi-circles with "$\phi$" enclosed, and inverters being designated by triangles with "I's" enclosed. The inverters may advantageously be transistor switches which provide a "false" output for a "true" input and conversely a "true" output for a "false" input. Non-inverting drivers are shown by triangles with "D's" enclosed. Priority selection circuit 41 determines the lowest numbered adaptor which is calling for attention at any given time. Thus, of the lines AAN–01, AAN–02, AAN–03, etc., no more than one of these lines will be true at any given time. For example, if the AAN'–02 line is "false" indicating that adaptor 2 needs attention and neither adapter 0 nor adaptor 1 needs attention, then a "true" signal will appear on line AAN–02 and will be prevented from appearing on line AAN–03 and all succeeding lines. In addition, a signal appears on line AAN whenever any of the adaptors needs attention.

The attention-needed encoding circuit 44 encodes the number of any one of the adaptors selected by priority circuit 41. Thus, for example, if adaptor 2 is selected by priority circuit 41, a signal will be provided on only the 2-bid input line of encoder 44. The outputs of encoder 44 will then transmit reset signals to flip-flops S8F, S4F, and S1F and a set signal to flip-flop S2F of selection register 45. Selection register 45 is made up of four flip-flop circuits which are set or reset by signals from encoding circuit 44 when applied to these flip-flop circuits in conjunction with a control signal and a clock pulse.

It may be seen from FIG. 4 that the adaptor selected by priority circuit 41 and encoded by encoding circuit 44 will set into S-register 45 at control state $Q=00$.

Several other signals are selected on the basis of the particular attention-needed signals selected by priority circuit 41. Thus, for example, selection circuit 42 provides output signals in part determined by the particular adaptor needing attention as selected by priority circuit 41. Thus, for example if we assume that adaptor 2 has been selected by priority circuit 41 and that line BS1'–02 is in the false condition, it may be seen that line BS1 will be in the true condition and an additional "1" bit will be encoded by encoder 44 and set into S-register 45.

The attention-needed selectors for the TRS' lines, BS2' lines, and BAM' lines operate in a manner identical to that described for the BS1' lines.

As described previously, the BS1' and BS2' lines enable an adaptor to cause the selection of a particular one of two or more rows of the buffer memory. The $Q=0$ control state for the system is an idle or no action state. If at the next clock signal the AAN line is "true," this is an indication that some adaptor needs attention. If at the same time the BAM line is "true" and the TRS' line is "true," then, as shown in FIG. 3, the control counter switches the control state of the system from $Q=0$ to $Q=1$. An input bit is then ready to be accepted from one of the adaptors and as shown in FIG. 4 the address of the buffer memory segment into which the bit is to be stored has been established in S-register 45.

Figure 5:
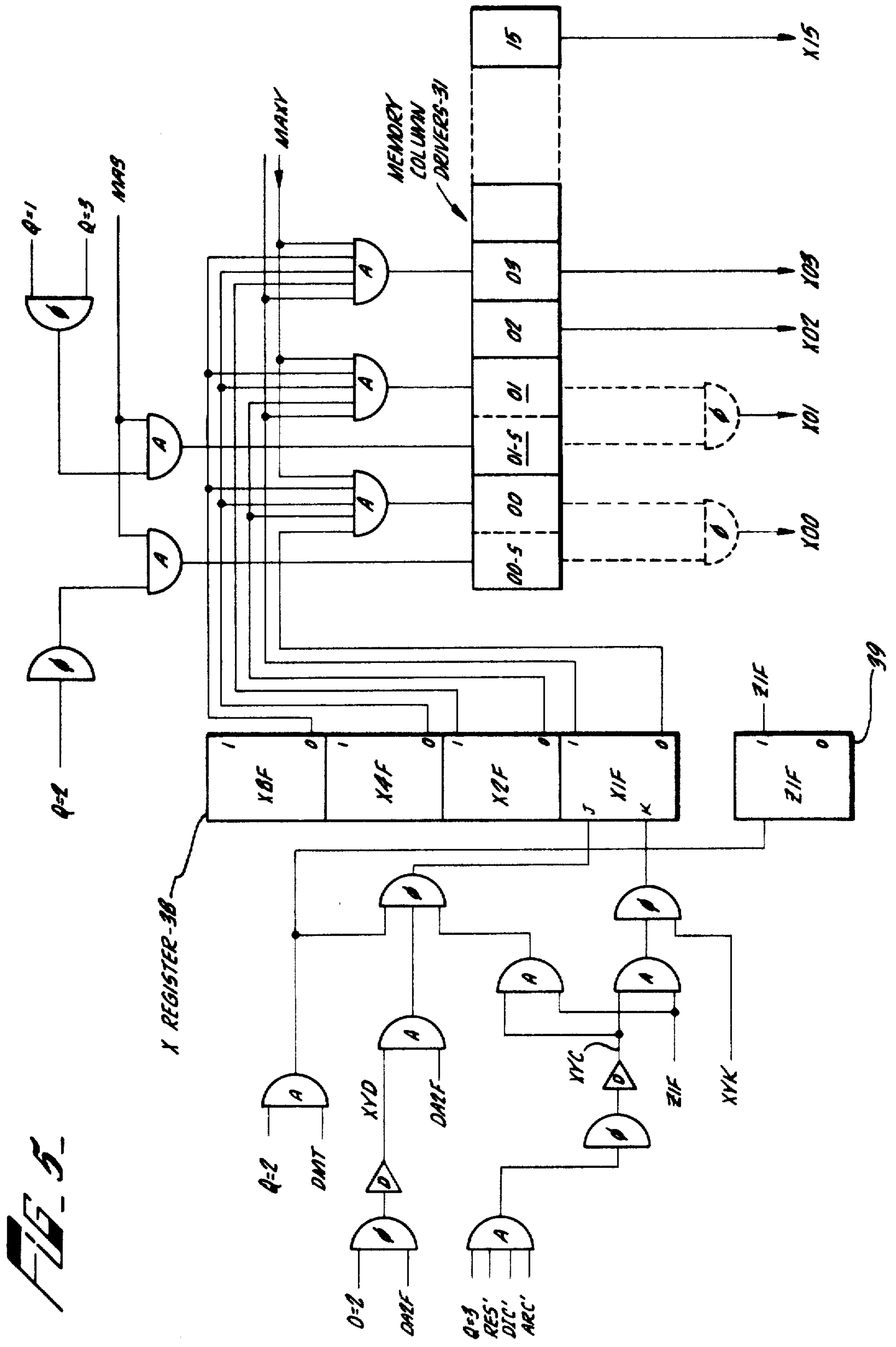

FIG. 5 depicts X-register 38, Z-register 39, and memory column drivers 31, shown in FIG. 2.

Figure 6:
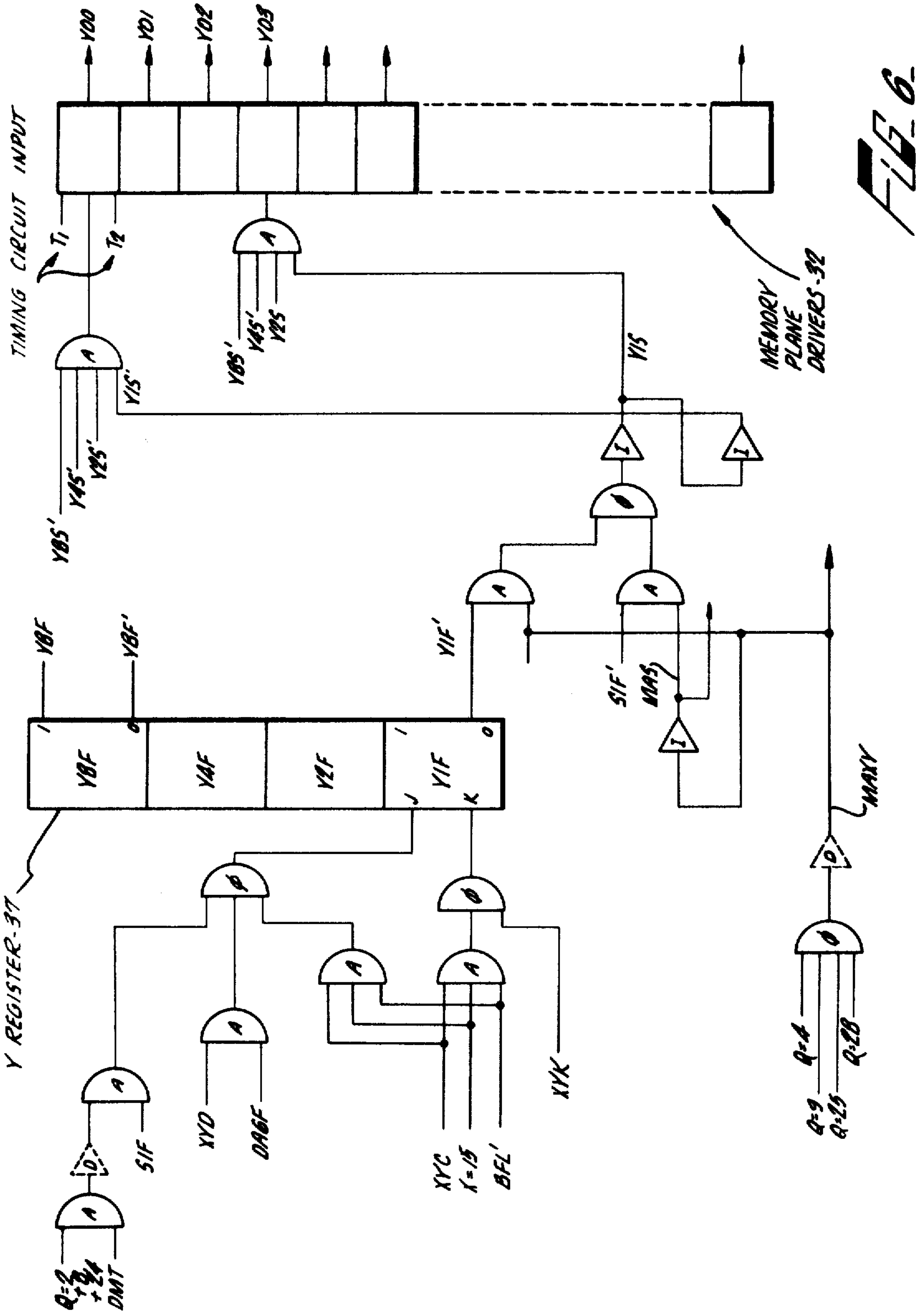

FIG. 6 depicts Y-register 37 and memory plane drivers 32, also shown in FIG. 2.

Figure 7:
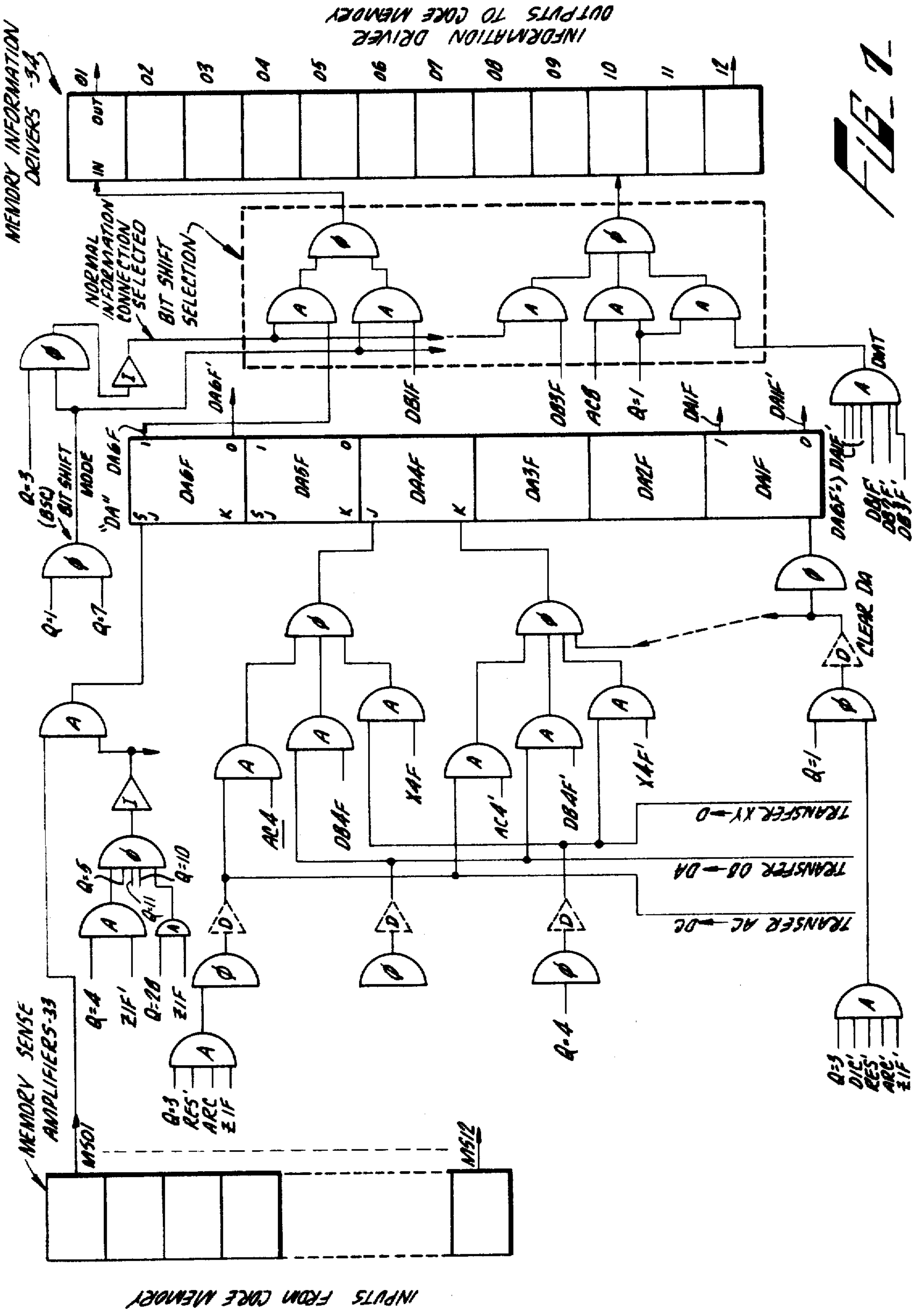

FIG. 7 depicts memory sense amplifiers 33, the upper half DA of D-register 36, and memory information drivers 34, also shown in FIG. 2.

Figure 8:
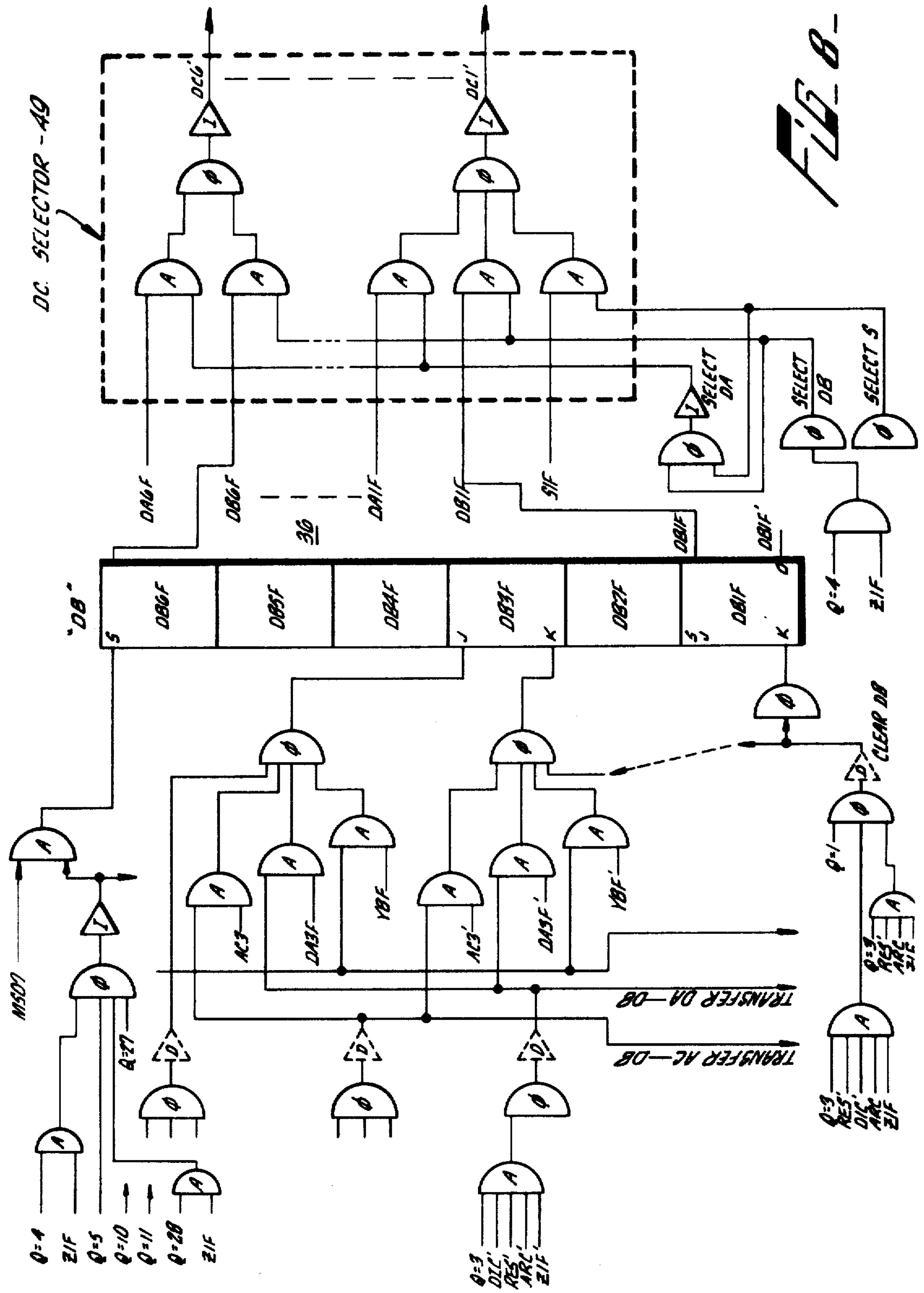

FIG. 8 depicts the lower half DB of D-register 36 and DC selection switch 49, also shown in FIG. 2.

*Input from adaptor—Control states $Q=1$ through $Q=5$*

As shown in FIG. 4, the output of the attention-needed encoder 44 is set into selection register 45 whenever any adaptor signals that it needs attention and the system is in the $Q=0$ or idle control state. If, at this time, the lines TRS' and BAM are both true, the system progresses to the $Q=1$ control state. In the $Q=1$ control state a memory read cycle is performed. The read cycle timing is controlled in a conventional manner by delay lines and timing circuits. The read cycle is followed always by a restore cycle and the information register 36 is set by means of a read strobe pulse to contain the information read out of the memory during the read cycle. During the read cycle performed in the $Q=1$ control state, the memory row is addressed by the S-register and the memory column 01 is addressed as indicated in FIG. 5. As a result, the second word location or input/output control section of the selected buffer segment is addressed for this read cycle.

As shown in FIG. 7, the bit shift mode connection between the D-register 36 and memory information drivers 34 is established at this time. If the DA section of the information register and the DB1F, DB2F, and DB3F flip-flops of the DB portion of information register 36 all contain zeroes, a "true" level will be established on the DMT line as shown in FIG. 7. If either the DMT line is "true" or if a "one" bit from the adaptor has been transmitted to the buffer control circuitry via the AC8 line, then the memory information driver 10 will be activated as shown in FIG. 7 and a "1" will be established during the write portion of the read cycle into position 10 of the input/output section of the selected segment of buffer memory 26. Also, at this time, a Bit Access Time signal is sent to the adaptor.

At the next clock signal the DA and DB registers are cleared as shown in FIGS. 7 and 8. Succeeding information bits transmitted to the buffer memory on line AC8 are assembled into a completed character within the input/output control section of the memory by means of the bit shift connection previously described and in a manner very similar to that fully described in the application of Richard S. Sharp previously referred to. Until the completed character has been assembled, the DA1 flip-flop of register 36 shown in FIG. 7 will remain in the zero condition and the control state $Q=0$ will be restored. As each bit of the character is transmitted to the buffer memory from the adaptor, the control state $Q=1$ will be re-established, the bit will be presented on line AC8 and the accumulation of the character will continue. When the full character has been assembled, the start bit of that character will have been shifted into the DA1 flip-flop of register 36. At this time, as shown in FIG. 3, the control counter will establish the control state $Q=2$. In the $Q=2$ control state another read cycle is performed with the memory addressed by the S-register with column 00 addressed, as shown in FIG. 5. The normal information connection between information register 36 and the memory information drives 34 is utilized during control state $Q=2$.

As shown in FIG. 6, the memory address selected during memory read cycles is selected by the X and Y registers when $Q=4$ and whenever not selected by X and Y is selected by the S-register. Since during the $Q=2$ control state the memory address is selected by S with column address 00, the driver for the $X=00$ column of memory is selected, as shown in FIG. 5. At this time, the address storage control location in the memory is addressed and the address stored therein is read out into the D information register. This address is the last address into which an input character had been stored. The address bits stored in the D information register are transferred to the X, Y, and Z registers, as shown in FIGS. 5 and 6. The information register 36 is cleared and the control state is increased by one to a control state of $Q=3$.

If during the control state $Q=2$ the line DMT is "true," the contents of the S-register 45 is transferred into Y register 37, as indicated in FIG. 6, and a "1" bit is stored in both the X1F flip-flop of X register 38 and in Z-register 39 as shown in FIG. 5. Control State $Q=3$ is then established.

The DMT line is true during control state $Q=2$ only if all the address bits in that control location were zero. The first character position into which an information character will be stored is that where the X-register stores a "2," the Z-register stores a "0," and the Y-register stores the contents of the *S*-register. In that case the last address used if there had been a previous address used would have been established by a "1" stored in the X-register and a "1" stored in the Z-register. Since the X, Y, and Z registers will be counted up to obtain the memory character position into which the next character will be stored and this next position to be established is addressed by $X=2$, $Y=S$, and $Z=0$, therefore the conditions $S=Y$, $X=1$, and $Z=1$ are established in the $Q=2$ control state whenever line DMT is true.

In the control state $Q=3$, another memory read cycle is performed with the restore portion of the cycle being inhibited. A memory address is selected using the S-register with column 01 being selected as shown in FIG. 5. A character access time signal is sent to the adaptor. As a result, a completed character, which at this time has been accumulated in the input/output location of the memory, is read out. Since this character is read into the D-register 36 and is not to be restored into the input/output location, the restore portion of the memory read cycle is therefore inhibited.

In the usual operation of the system the X, Y, and Z registers are counted up by "1" and the control state is increased by "1" at the next clock pulse. At this time the input character 6-bits which are to be stored into buffer memory 26 are in the DA portion of information register 36 as a result of the way in which bits were accumulated to form the input character. If at the beginning of the $Q=3$ control state the Z register were in the "1" condition, it will be counted up to the zero condition, and the input character will be stored on the next memory write cycle as the first or upper character of the memory word location, so the DB portion of input register 36 is simply cleared. If, however, the Z-register were in the "0" condition at the beginning of the $Q=3$ control state, it will go to the "1" condition when counted up and as a result the character which has been accumulated is to be stored as the second or lower character of a memory word position. As a result, and as shown in FIG. 8, the accumulated character stored in the DA portion of register 36 is transferred into the DB portion of the register and the DA portion of the register is cleared. As a result, the contents of the D-register are correct for the next memory write cycle.

If during control state $Q=3$ the line ARC is true, this indicates that the adaptor is calling for the replacement of the input character which has been assembled. This occurs for example when a special input translation is to be performed. The adaptor can recognize an assembled input character on the DC*n* lines and translate it into another character on the AC*n* lines. As indicated in FIG. 8, the character assembled in the information register 36 is sent to the adaptor on the DC lines. The information on the DC lines comes from the DA portion of information register 36 or from the DB portion depending on particular conditions, as shown in FIG. 8. The normal input to the DC lines is from the DA register so these lines normally contain the character bits which have been accumulated. The adaptor drives its AC lines from various logic included within the adaptor and upon recognizing that the character appearing on the DC lines is to be translated, it effects the required translation and provides on AC lines 1 through 6 the character which is to be inserted. The replacement character appearing on the AC lines is then transferred into either the DA or DB portion of D-register 36, as directed by the Z-register. The X, Y, Z registers are counted up and the control state is increased by "1" to state $Q=4$.

If during control state $Q=3$ the adaptor wished to discard the character which had been accumulated, the DIC line is set by the adaptor to a true condition thereby indicating that the character is to be discarded. At this time the DA and DB registers would be cleared, the X, Y, and Z registers would be cleared and the control state would be returned to the state $Q=0$. If during control state $Q=3$ the adaptor determined that the resetting operation should occur, the RES line would be set to a true condition, the DA and DB registers would be cleared, and the control state would be set to the state $Q=5$.

In state $Q=5$, a memory access is performed using the S-register and $X=0$, and reading into the DA and DB registers is inhibited. Thus, a memory write cycle is performed. At the next clock pulse the DA and DB registers are cleared, the X, Y, Z registers are cleared, and the control state $Q=0$ is re-established.

It will be recalled that while in the $Q=3$ control state, during normal operation, the adaptor logic does not recognize the accumulated character as a particular group mark. The lines RES′, DIC′ and ARC′ will all be true and the control state $Q=4$ will be established. During the control state $Q=4$ the accumulated character is stored in its proper location within the buffer memory. A read cycle is performed with the memory address selected by the X, Y, Z registers.

During the read cycle, the read out into either the DA or DB register is inhibited depending upon the state of the Z flip-flop. If the Z1 flip-flop is zero, then the DA-register contains the characters to be stored in memory and the DB-register is cleared. Therefore, the memory read out into the DA-register is inhibited and the bits stored in the DA-register are stored into the cores. For the DB-register, information therefore comes out of the cores into the DB-register and is then restored back into memory without being altered. If the Z1F flip-flop contains a "1," the read into DB rather than into DA is inhibited. Additionally, if the Z1F flip-flop stores a "1," the character stored in the DB-register is transferred to the DC lines, while if the Z1 flip-flop is zero, the character stored in the DA register is transferred to the DC lines. The new character in either DA or DB must be transmitted to the DC lines and thence to the adaptor to enable the adaptor to recognize the "end of input" character when it appears. At clock time, while in the $Q=4$ control state, if the adaptor has not recognized the character as the "end of input" character, the EIR′ line wi l be in a "true" state and the address stored in the X, Y, Z registers will be transferred to the D-register.

If, on the other hand, the adaptor had recognized the character as the "end of input" character, the DA-register is cleared and the first four flip-flops of the DB register will be cleared. Flip-flops 5 and 6 of the DB register will have "1's" stored therein, however. These "1's" are control bits used in establishing an operation with the processing system. The "1" set into flip-flop DB6F indicates that the buffer memory is ready for system attention while the "1" set into flip-flop DB5 indicates that the buffer is read ready since it contains a complete message.

If during control state $Q=4$ the "end of input" character is recognized by the adaptor and there is no interrupt existing from a previous input operation and there is no system operation in progress, then N8F flip-flop is set to the "1" state to indicate that an interrupt now does exist and additionally the T-register is set from the S-register in order to remember which buffer segment was the first to have the interrupt. After the clock pulse in control state $Q=4$, control state $Q=5$ will be established. The operations within this control state are as previously indicated when this control state was discussed following the initiation of a reset within control state $Q=3$.

The previous control states $Q=1$ through $Q=5$ have all related to the transfer of input information from the memory adaptor to the buffer memory.

Figure 9:
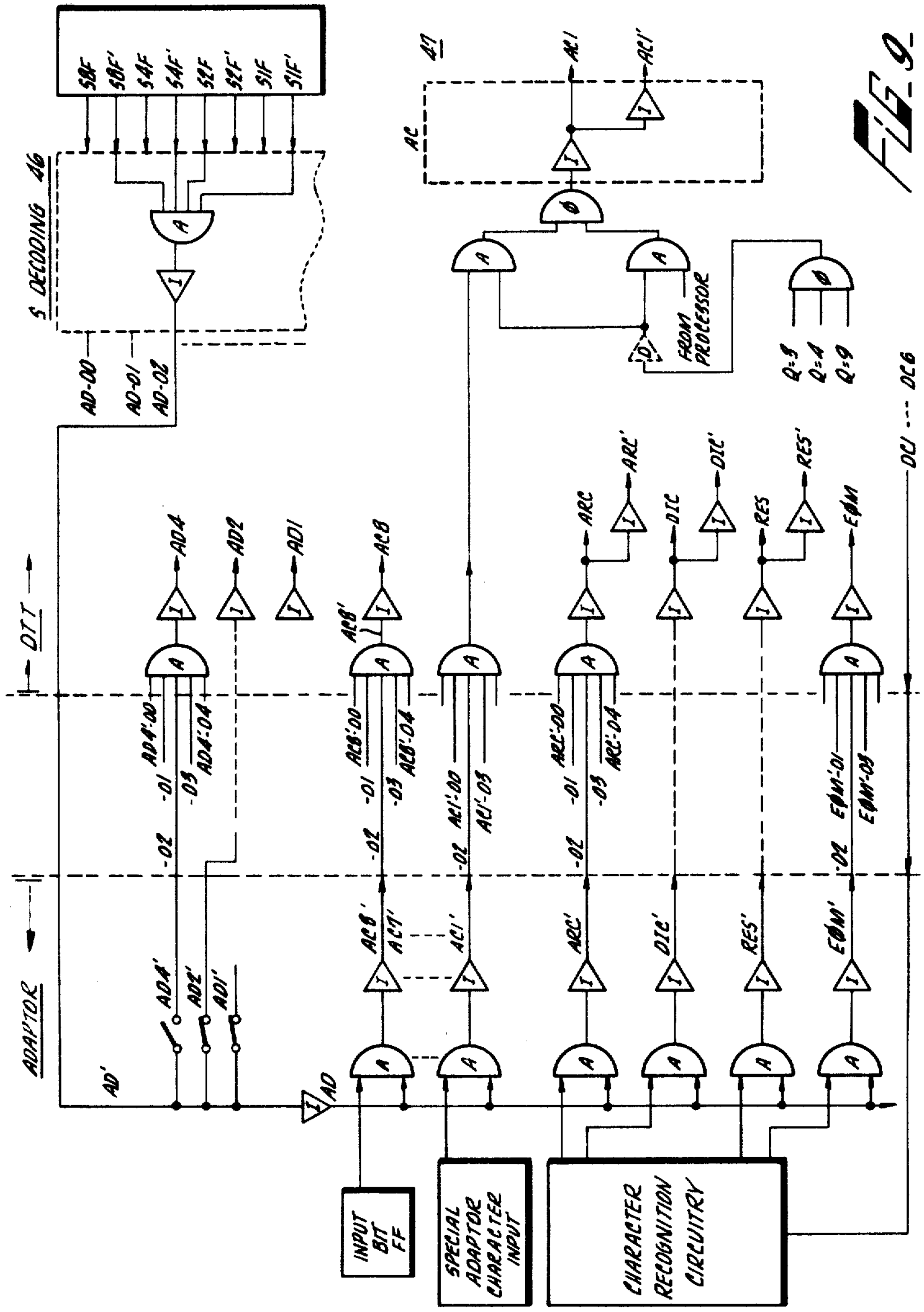

FIG. 9 depicts decoding circuit 46 shown in FIG. 2, and indicates logical circuitry by means of which the adaptors provide signals on certain of the lines previously discussed. After an adaptor has signalled that it needs attention, the selection register 45 will have been set to indicate the address of the buffer segment associated with the adaptor needing attention. The decoding circuitry 46 receives the value stored in register 45 and decodes it whereby a single output line from decoding circuitry 46 is rendered "false." The decoding circuitry 46 has a number of output lines equal to the number of adaptors but only one of these outputs lines will be established in the "false" condition as a result of the decoding operation performed by this circuitry. Only the output line associated with the adaptor which has been designated by priority circuitry 41 will be set to the "false" condition. An adaptor is designated if the AD′ line to it is false. The AD′ lines are therefore used to enable only the designated adaptor to set adaptor description bits into the AD1, AD2 and AD4 lines which are sent to the buffer control circuitry. Additionally, the AD lines are used to apply incoming bits from the designated adaptor to the AC8 line. The DC*n* lines from buffer control are applied to character recognition circuitry within the designated adaptor and such circuitry determines whether "false" levels should be established on the ARC′, DIC′, RES′, and EOM′ lines. When the adaptor recognizes that the character assembled within the input/output section of the buffer memory should be replaced, a "false" level is established on the ARC′ line and special adaptor character input circuitry provides the replacement character on the lines AC1 through AC6.

*Output to adaptor—Control states $Q=7$ through $Q=11$*

The next control states which will be discussed are control states 7 through 11 which relate to the transfer of output information from the buffer memory to the adaptor when the adaptor is operating in a bit mode condition. In this operation the adaptor obtains characters from the buffer. This output operation is started as a result of a signal which occurs at the end of a write operation executed by the data processor wherein the processor has stored information in the buffer memory which is ready to be transmitted to the adaptor. The signal generated is applied to the STR line indicating Start Transmit and is sent to the adaptor. The adaptor stores this signal in a flip-flop circuit located within the adaptor in order to remember that it will now be operating in the output mode. The adaptor then samples the conditions of the lines connecting it to its remote peripheral unit and if the line is ready to receive information the adaptor will signal attention needed. At this time the adaptor signals attention needed on the AAN′ line. The adaptor is now in a transmit state and the line TRS′ is "false" whereas the lines AAN′, and BAM′ are at a "true" level. As a result the system will change from control state $Q=0$ to control state $Q=7$.

The control state $Q=7$ represents a request by the adaptor to obtain an output bit. A memory read cycle is performed with the memory address selected from the S-register with the memory column 01 selected. The bit shift connection is again activated to connect information registers DA and DB to the information drivers 34 in accordance with the shift path as indicated in FIG. 7. A bit access time signal is transmitted to the adaptor and an output bit to the adaptor will appear on line DC8. The output bit appearing on line DC8 will be a "1" either if the flip-flop DB6 is in a "1" condition or if the line DMT is true. At the clock time, while in state $Q=7$, the information registers DA and DB will be cleared. The control state $Q=8$ will be established if the line DMT is "true," indicating that the information register 36 is now empty and the control state $Q=0$ will be re-established if the line DMT is false.

The control state designated $Q=8$ designates a beginning of a character cycle. A memory read cycle is performed with the address selected by the S-register with $X=0$ and the memory column 00 selected. At this time the normal information connection rather than the bit shift connection is established between the D-register and the memory information drivers. At the time of the succeeding clock pulse, the address stored in the address control location of the buffer memory segment will be present in the D-register. This address is transferred to the X, Y, Z registers in order that it may be used subsequently to address the memory. The address that is expected in the D-register at this time is the address of the next character to be read from memory. If the stored address which has been transferred from the D-register to the X, Y, Z registers contains all zeroes, this indicates that there is no character address which had been stored in the address control location of buffer memory. When this is the case, the DMT line will be in a true condition and an ini ial address will be established in the X, Y, Z registers by transferring the contents of the S-register to the Y-register and by setting a "1" in the X2 flip-flop of the X-register. Upon having established the proper address of the next character to be read from memory within the X, Y, Z registers, the DA and DB registers are cleared and the control state $Q=9$ is established.

In the control state $Q=9$, a memory read cycle is performed with the memory addressed by means of the X, Y, Z registers. Again at this time the normal information connection between the D-registers and the memory information drivers is utilized rather than the bit shift connection. A signal is applied to the CAT line at this time in order to indicate to the adaptor that it is now character access time. The adaptor, at this time, is sent the particular character which has been read out of memory. This character is supplied to the adaptor on the DC line. It is supplied to the DC lines from either the DA or the DB register depending upon the condition of the Z flip-flop. This is necessary since the character which has been read out of memory and stored in the D-register could have been either in the upper half of the memory word location or in the lower half of the memory word location. The state of the Z flip-flop indicates which half of the word read out of memory contains the desired character. Thus, if the Z-register contains a zero, the contents of the DA-register will be transferred to the DC lines whereas if the Z flip-flop contains a one, then the contents of the DB-register will be transferred to the DC lines. Thus, in either case, the adaptors will be able to determine from the DC lines the particular character which has just been read out of memory. The adaptor at this time can control the subsequent handling of the character which has been read out of memory by means of signals applied to one or more of three lines. These are the RES' line, the DIC' line, and the ARC' line. The manner in which signals are applied to these lines in response to the particular character which has been read out of the memory, supplied to the adaptor on the DC lines, and recognized by internal logical circuitry of the adaptor is indicated in FIG. 9.

If the adaptor does not recognize the character which has been supplied on the DC lines, and this will be the normal case, it will not supply a signal to any of the three lines. At the time of the succeeding clock pulse the X, Y, Z registers will be counted up by one in order that the value stored therein will point to the next character in memory when this value is restored in the address control section of the memory. If the Z-register is in the "1" condition at this time the contents of the DB-register are transferred to the DA-register. Therefore, regardless of whether the character which has been read out of memory was in the upper half or the lower half of the word position in which it was stored, the character will be placed in the DA-register. At this time special bits are inserted in the DB-register, as specified in the AD1', AD2', and AD4' signals, in order to establish in the D-register a character which includes start bits, stop bits and the like which are to be transmitted to the adaptor. As a result, regardless of the state of the Z flip-flop, there are six primary information bits in the DA-register and particular additional bits in the DB-register. At this time the control state is changed to that designated by $Q=10$ which is the normal next state.

If, however, the adaptor recognized during state $Q=9$ the character supplied it on the DC lines and in response thereto applied a signal to one or more of the RES', DIC' and ARC' lines, certain other operations occur during state $Q=9$. If the adaptor had wished to make a special translation of the character supplied to it on the DC lines during state $Q=9$, it then would establish a signal on the ARC line. The adaptor character, in case there is one, will now be presented to the buffer control circuitry on the AC lines. As a result of the ARC line being "true," the X, Y, Z registers would be counted up by one and the DB-register would be encoded, just as in the normal case, but the contents of the AC lines would be transferred to the DA-register. Thus, the new character supplied by the adaptor replaces the old character previously in the DA-register. At this time, just as in the normal case, the control state changes to $Q=10$.

If during state $Q=9$ the adaptor had wished to insert an extra character, the adaptor would place signals on both the DIC' line and the ARC' line. This would happen, for example, when the adaptor desires to substitute two characters in place of one. In this case, the new character supplied on the AC lines is again inserted into the DA-register and the DB-register is encoded, but the X, Y, Z registers are not counted up by one as in the previous cases. At this time we also change the control state to the state $Q=10$.

If during the state $Q=9$ the adaptor had called for a resetting operation, it would have provided a signal on the line RES'. For example, it may do this at the end of a message or whenever the line connection has become broken. At this time the information registers DA and DB are cleared and the control state is changed to $Q=11$.

As stated above, the next normal control state after the state $Q=9$ is the state $Q=10$. During the state $Q=10$ the encoded character which is to be sent to the adaptor is loaded into the input/output control location of the buffer from which it is accessed by the adaptor a bit at a time. When in state $Q=10$, a memory write cycle is performed in which the memory is addressed from the S-register with memory column 01 selected. The read out of the cores is inhibited to achieve the write cycle. At this time the normal information connection rather than a bit shift connection again exists between the information register and the memory information drivers. The adaptor at this time contains information about whether the end of transmission has been reached or not. At the time of the previous signal on the CAT line sent to the adaptor, the adaptor recognized whether or not an "end of transmission" character had been supplied to it on the DC lines. If an "end of transmission" character had been recognized, a flip-flop within the adapter was set in order to remember this.

At the time of a clock pulse during control state $Q=10$ the adaptor provides a signal from this flip-flop on line EOT if an end of transmission character had been recognized. If the EOT' line is "true," indicating that an end of transmission character was not recognized, the contents of the X, Y, Z registers are transferred back into the D-register. If the EOT line is true, indicating that the end of transmission character has been recognized, the DA and DB registers are cleared. Whether the end of transmission character was recognized or not, the control state denoted by $Q=11$ is established next.

In the control state designated $Q=11$, a memory write cycle is performed in which the memory is addressed by the S-register and memory column 00 is selected. Read out into the DA and DB registers is inhibited and the normal information connection between the D-register and the memory information drivers is utilized. As a result, at this time the contents of the address control location within the memory are updated. Subsequent to the next clock pulse the DA and DB registers are cleared, the X, Y, Z registers are cleared, and the idle control state designated $Q=0$ is resumed.

The control state $Q=1$ through $Q=5$ previously discussed, all relate to the transmittal of input information from the adaptor to the buffer with the adaptor operating in bit mode. Similarly, the control states $Q=7$ through $Q=11$ just discussed relate to the transfer of output information from the buffer to the adaptor with the adaptor operating in bit mode. Analogous inputs may be made to the buffer from the adaptor and analogous outputs may be made to the adaptor from the buffer with the adaptor in both cases being operated in character mode rather than in bit mode.

When the adaptor transmits characters to the buffer they are transmitted on all of the AC lines rather than on the single line AC8. Similarly, when output information is transferred to the adaptor from the buffer a character at a time, the character is transmitted simultaneously on all of the DC lines rather than a bit at a time on the single line DC8. When the adaptor operates in character mode rather than in bit mode, the transfer of information between the adaptor and the buffer is greatly simplified. The operations for such transfer are virtually identical to those previously discussed for the bit mode of operation with, however, the bit access cycles being completely bypassed. As a result, the character mode input and output operations between an adaptor and the buffer will not be discussed.

*Processor read and write operations—Control states $Q=20$ to $Q=29$*

Figure 10:
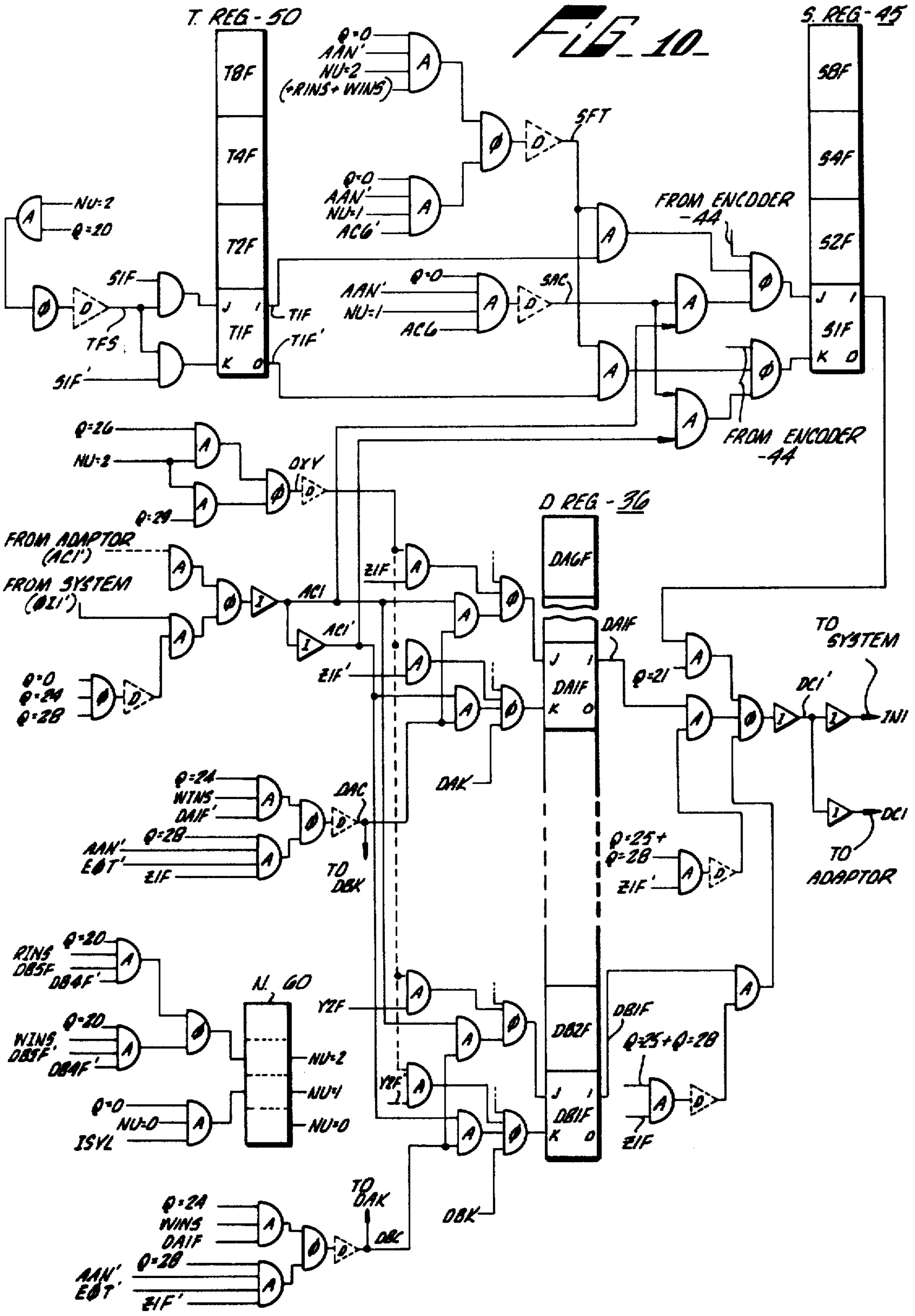

Next, the transfer of information between the buffer memory 26 and the data processing system will be discussed. Assume again that the system is in the idle state designated by $Q=0$. At this time information signals from the processing system are available to AC switching circuit 47 as shown in FIG. 2. A signal from the processing system will occur at the beginning of every system operation into the terminal unit. This signal will appear on a line designted ISYL. An N-register 60 as well as the T-register 50, S-register 45, and D-register 36, are depicted in FIG. 10. As indicated in FIG. 10, a signal on the ISYL line is recognized only when the N-register is in the zero condition and the appearance of the signal on the ISYL line when the N-register is in the zero condition will set the N-register to the one condition. This is done for synchronizing purposes. There are two possibilities when the N-register has been set to the one condition by a signal on the ISYL line, namely whether the system is desirous of initiating communication with a particular one of the buffer memory segments or whether it is desirous simply of communicating with that buffer segment whose address was previously stored in T-register 50. If the incoming information from the system has established a true signal on the line AC6′, then the processing system is not trying to set the S-register itself and a normal transfer is made of the value stored in the T-register to the S-register, and the control state designated $Q=20$ is established. The value which had been stored in the T-register showed which buffer was waiting for attention. The transfer of this value to the T-register had been made during the input character cycle upon recognition of the end of input. If on the other hand the information received from the procesing system established a true condition on the AC line, then the four numeric bits established by the system on the lines AC1 through AC4 are transferred into the S-register 45 and this register will then contain an address which has been provided by the processor itself. Again, the next control state designated by $Q=20$ is established. The establishment of this value into the S-register 45 is indicated in FIG. 10.

The control state $Q=20$ concerns the examination of control bits in the buffer at the beginning of this operation with the system. A memory read cycle is performed with the address selected by the S-register with column address 00. The normal connection is again established between the D-information register and the memory information drivers.

Subsequent to the next clock pulse, the system request is compared with the state of the D-register, which now indicates the state of the buffer memory at this time. The system request for an information transfer operation is indicated by a true level appearing on either the RINS line indicating that the system desires to perform a read operation, or by a true level appearing upon the WINS line indicating that the system desires to perform a write operation. The state of the buffer is indicated by the condition of the DB4, DB5, and DB6 flip-flops of the DB-register. If the DB4 and DB5 flip-flops, considered together, are in the zero condition an "idle buffer" condition is indicated; if they are in the "one" condition a "busy condition" is indicated; if they are in the "two" condition a "read ready" buffer condition is indicated; and if they are in the "three" condition a "write ready" buffer condition is indicated. The condition of the DB6 flip-flop indicates whether an interrupt bit has been stored in this bit position.

If the processing system is requesting a read operation as indicated by the line RINS being in a "true" state and the buffer memory is in a "read ready" state, as indicated by the DB5 flip-flop having a "1" stored therein, and the DB4 flip-flop having a "0" stored therein, then the N-register is set to the "two" condition and the value stored in the S-register is loaded into the T-register in order to allow the S-register state to be recalled in case the ensuing transfer operation is interrupted by an adaptor request for attention. The terminal unit must remember what buffer is being worked with in case the operation with this buffer is subsequently interrupted. The T-register must therefore always contain the number of that buffer which is being accessed by the processing system. At this time the system control state is changed to the state indicated as $Q=21$.

If the system requests a write operation, as indicated by a "true" level established on the WINS line, and the buffer is in a "write ready" condition, as indicated by "1's" being stored in both the DB4F and DB5F flip-flops, the N-register is set to the "two" condition and the value stored in the S-register is transferred to the T-register.

Alternatively, if the processing system requests a write operation by placing a "true" signal on the WINS line and the buffer is in the idle condition, as indicated by both the DB4 and the DB5 flip-flops storing zeroes, it is desired that the write operation be permitted to occur. If the buffer memory is in the idle condition when the write request appears, this is an indication that the processing system is initiating the write request rather than responding to a previous inquiry initiated by one of the adaptors. In this situation the N-register is again set to "two" and the contents of the S-register are again transferred to the T-register and in addition a "1" is stored in both the DB4 and DB5 flip-flops in order that the buffer state is designated as write ready. In each of the previous three situations the control state is advanced from the state $Q=20$ to the state $Q=21$. In the control state $Q=21$, the memory cycle is inhibited, the value stored in the S-register is provided to the processing system on the DC lines and the processing system is told that it is now character time by means of a signal appearing on a line sent to the processing system which is designated the TCT line, TCT standing for terminal character time. The preceding is indicated in FIG. 10, wherein is shown a driver to drive the DC lines which provide signals to the adaptors and IN lines which provide signals to the processing cycle. As shown, the same signals will appear on the DC lines and on the IN lines but the difference in terminology is used to indicate which lines transmit signals to the adaptor and which lines transmit signals to the processing system.

As shown in FIG. 10, during control state $Q=21$ AND gates are activated to transmit to the processing system the values stored in S-register 45. The values stored in this register are transmitted to the processing system over the IN lines. This is necessary since the processing system must know this S-register value in case it did not specify the value presently stored in the S-register. Such is the case whenever the processing system is responding to an inquiry rather than initiating its own communication.

Also, at this time, there is indicated to the system on three other lines what the present state of the buffer is, i.e., whether the buffer is "read ready," "write ready" or "busy." These indications are transmitted to the processing system over the lines RRL, WRL, and BUL, respectively. It may be seen that only one of these lines can be true at any given time. These line values are established by the state of the DB4 and DB5 flip-flops and indicate the state of the buffer at any given time.

The next several steps which occur within control state $Q=21$ occur after the next clock pulse and deal with the control of the interrupt bit which may be stored in flip-flop DB6. If a buffer had previously been set to the interrupt state, the flip-flop DB6 will contain a "1." This state of the buffer has now been recognized by the system so the DB6 flip-flop may be reset to the "0" condition and the N8 flip-flop of the N-register may also be reset to the "0" condition. The N8 flip-flop is an interrupt flip-flop which drives an interrupt line to the processing system and it too is now reset since the interrupt has been recognized by the system.

If the DB6 flip-flop is in the "1" condition and the N-register is storing a "1," this means that a system read or write operation will not be forthcoming since if it were the N-register would be storing a "2." In this case the N-register is set to "3" which setting causes a scan cycle to ensue which runs through the buffers to determine if any other interrupt bits have been set. If, on the other hand, the DB6 flip-flop is not in the interrupt condition and the N-register is storing a "1," then the N-register is cleared. This indicates that neither scan cycle nor a system operation is going to occur.

If the N-register is storing a "2" then a system operation is going to follow and the DA and DB registers are cleared. This is done particularly to reset the status bits since the system has already been told what the buffer state is and the system has acted upon it.

Subsequent to any of the preceding operations in control state $Q=21$, the succeeding control state $Q=22$ is established. Control state $Q=22$ relates to a cycle in which the address storage location in the buffer segment is overridden in order to update the status bits stored within this location. This results since flip-flops DB4, DB5, and DB6 have been manipulated and it is desired to insure that the buffer memory receives the updated bits. Thus, a memory write cycle is performed in which the memory address is selected by the S-register with memory column 00 selected and the normal information connection is utilized between the D-register and the memory information drivers. Subsequent to the next clock pulse the DA and DB registers will be cleared and the idle control state $Q=0$ is re-established.

The system is now in the idle control state $Q=0$ with the N-register storing a "2." With the N-register storing a "2," and the AAN′ line true, a system read or write operation will commence upon establishment of the "true" level upon either the RINS line or the WINS line reply. The S-register is loaded from the T-register and the control state designated by $Q=24$ is established.

In the control state designated $Q=24$, a system transfer is carried out. A memory read cycle is carried out in which the memory address is selected by the S-register with column address 00 selected. Again the normal information connection is utilized. After the succeeding clock pulse, the address read out into the D-register is transferred to the X, Y, Z registers. If the DMT line is "true" an initial address is established by setting the Y-register from the S-register and by setting the X2F flip-flop to the "1" condition. For the system read operation which occurs when the RINS line is "true," the DA and DB registers are cleared at this time and the control state designated $Q=25$ is established.

In control state $Q=25$, a memory read cycle is performed in which the memory is addressed by the X, Y, Z registers with the normal information connection again being utilized. The information character which has been read out into the DA or DB register is transmitted to the processing system via the IN lines. If the Z flip-flop contains a zero, the character stored in the DA-register is transferred to the DC lines and subsequently to the IN lines. If, on the other hand, the Z-register is in the "1" condition, the characters stored in the DB-register are transferred to the DC lines and subsequently sent to the processing system via the IN lines. Thus, the processing system receives the character which has been read out of the addressed section of buffer memory. A signal appearing at this time on the TCT line indicates to the system that it should read the incoming character on the IN lines. At the succeeding clock pulse, the X, Y, Z registers are counted up by one in order to subsequently address the next character stored in buffer memory and the information registers DA and DB are cleared.

The system stays in state $Q=25$ and transfers character after character to the processing system until one of two things happens. First, whenever a "true" level appears on the AAN line indicating that some adaptor is requesting attention, the $Q=25$ state is interrupted and the system goes to the control state designated by $Q=26$. Secondly, whenever the adaptor signals that the "end of input" character has been recognized by establishing a "false" level on the line EOT′, the system also goes to the state designated $Q=26$ and the N-register is set to "3," thereby indicating that the system operation has been terminated and that thereafter a scan cycle will occur. The adaptor can recognize the "end of input" character when it is transmitted to the processor since characters sent to the processing system appear on the DC lines sent to the adaptor as well as on the IN lines sent to the processing system.

In the control state designated by $Q=26$, the memory cycle is inhibited. If the N-register stores a "2," this is indicative that a read operation has been interrupted. The values stored in the X, Y, Z registers are transferred back into the D-register for subsequent storage in the address location within the buffer memory segment and the next control state designated $Q=27$ is established.

In the control state $Q=27$ a memory write cycle is performed with the memory addresed by the S-register with $X=0$ and with the normal information connection again being utilized. This writes the address which has been stored in the D-register during control state $Q=26$ back into the address control location within the buffer segment. Upon the next clock pulse the DA and DB registers are cleared, the X, Y, Z registers are cleared, and the idle control state $Q=0$ is re-established.

If, while in control state $Q=24$, a write operation rather than a read operation had been indicated by a "true" level appearing on line WINS, the character lines from the processing system send input information to the buffer by means of the AC lines. The input character appearing on the AC lines is transferred to the DA or DB register depending upon the condition of the DA1 flip-flop. The DA1 flip-flop contains the Z flip-flop address bit prior to its being set into the Z flip-flop. Therefore, at this time we use the DA1F flip-flop for control purposes rather than the Z flip-flop. If the DA1F flip-flop is in the zero condition, then the input character received from the processing system on the AC lines is transferred into the DA-register, the DB-register is cleared and control state $Q=28$ is established. If, on the other hand, the DA1F flip-flop is in the one condition, then the input character received from the processing system on the AC lines is transferred into the DB-register, the DA-register is cleared and control state $Q=28$ is established.

In control state $Q=28$ the memory is addressed by the X and Y registers with the normal information connection between the D-register and the memory information drivers being utilized. During the memory cycle, read out is inhibited into that half of the D-register which contains the input character which has just been loaded into it. Thus, if the Z flip-flop is in the zero condition, read output into register DA is inhibited while if the Z flip-flop is in the one condition, read out into the DB-register is inhibited. Again, an output from the processing system appears on the AC lines. The DC lines are connected to either the DA or DB register in accordance with the condition of the Z flip-flop in order that the adaptor can see the character stored therein and can thereby recognize the end of transmission character when it occurs. Thus, when the Z-register is in the zero condition, the DC lines are connected to the DA-register whereas if the Z flip-flop is in the one condition the DC lines are connected to the DB-register. A signal is provided on the TCT line to the processor in order that the processing system send the next character. Subsequent to a clock pulse, the X, Y, Z registers are counted up by one.

In the absence of either of the terminating conditions, i.e., an adaptor needing attention or the end of transmission being recognized, a next character is transferred from the processing system and written into a proper location within the memory. The Z flip-flop is again utilized to control the routing of the character into the proper section of the memory word selected by the X and Y registers. Thus, if the Z flip-flop is in the zero condition at this time, the character received from the processing system will be stored in the DB-register while the DA-register is cleared. If, on the other hand, the Z flip-flop is in the one condition, the input character received from the processing system is loaded into the DA-register and the DB-register is cleared. These conditions, which govern the transfer of the incoming character into the D information register, are indicated in FIG. 10

If during control state $Q=28$ a "true" level does appear on line AAN, indicating that an adaptor is ready for attention, the control state $Q=29$ is established. If, on the other hand, the "end of transmission" character is recognized during control state $Q=28$, the control state $Q=29$ is also established and in addition the N-register is set to the value "3."

In control state $Q=29$, the memory cycle is inhibited. If the N-register contains a "3," thereby indicating that the end of an operation had occurred, the start transmit signal to the adaptor is activated by establishing a "true" level on line STR. This indicates to the adaptor that it can now send the information which has been stored in the buffer. After a subsequent clock pulse, the DA and DB registers are cleared, since the preceding operation has terminated, and the control stat $Q=27$ is established. If during control state $Q=29$ the N-register contains a "2" rather than a "3," this indicates that a preceding write operation had been interrupted rather than terminated, the values stored in the X, Y, Z, registers are transferred to the D-register, and the control state $Q=27$ is established.

The control state $Q=27$ was previously discussed at the end of a read cycle. It operates in an identical manner at the end of a write cycle operation. A memory write cycle is performed in which the memory is addressed by the S-register with $X=0$ and using the normal information connection. Subsequent to a clock pulse the DA and DB registers are cleared, the X, Y, Z registers are cleared and the idle control state $Q=0$ is again re-established.

The preceding discussion has been directed to the operation of buffer memory 26 and the buffer control circuitry shown in FIG. 2. The operation of this circuitry is essentially independent of whatever particular line adaptor is receiving information from memory 26 or transmitting information to memory 26 at any given time. The line adaptors enable the buffer memory 26 and buffer control circuitry to operate independently of whatever peripheral unit is being communicated with by connecting each of these units to the buffer control circuitry via the uniform interface which has been described previously. The line adaptors thereby render diverse peripheral units compatible with a single buffer memory and its associated buffer control circuitry.

Figure 11:
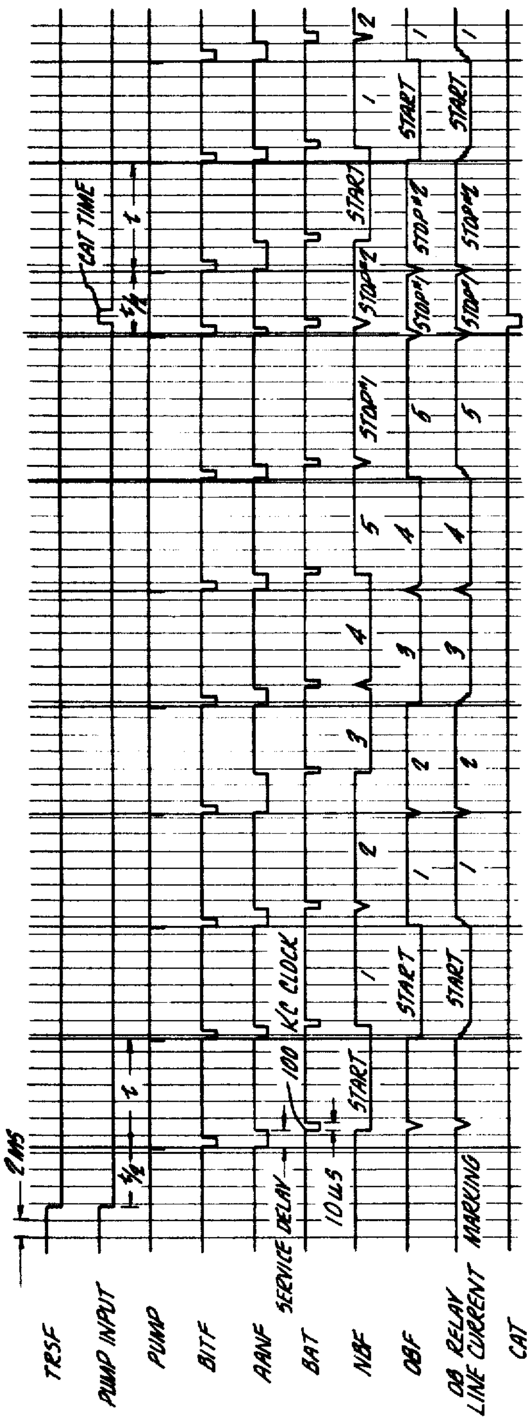
FIGS. 11 through 23 depict circuitry and timing diagrams relating to several exemplary line adaptors shown in block diagram form in FIG. 1.

Two exemplary ones of these line adaptors will now be described. FIG. 11 depicts a timing diagram for a line adaptor designed to accommodate Model 28 Teletype units to the aforesaid uniform interface. FIG. 11 depicts timing relationships which occur during an output operation wherein characters are transmitted from the buffer memory 26 to a particular Model 28 Teletype unit. The Model 28 Teletype unit may comprise a typewriter or a paper tape reader or a paper tape punch. It utilizes a 7½ unit code containing a start bit, five information bits and 1½ stop bits. The 5 information bits convey information in Baudot code.

The timing diagram shown in FIG. 11 depict signals which appear on various lines associated with the adaptor during the output operation. The vertical lines appearing in the figure represent each 200 clock pulses and are therefore two milliseconds apart, the clock pulse generator producing 100 kc. pulses. The diagram shown in FIG. 11 will be discussed in further detail in connection with the discussion of succeeding figures.

Figure 12:
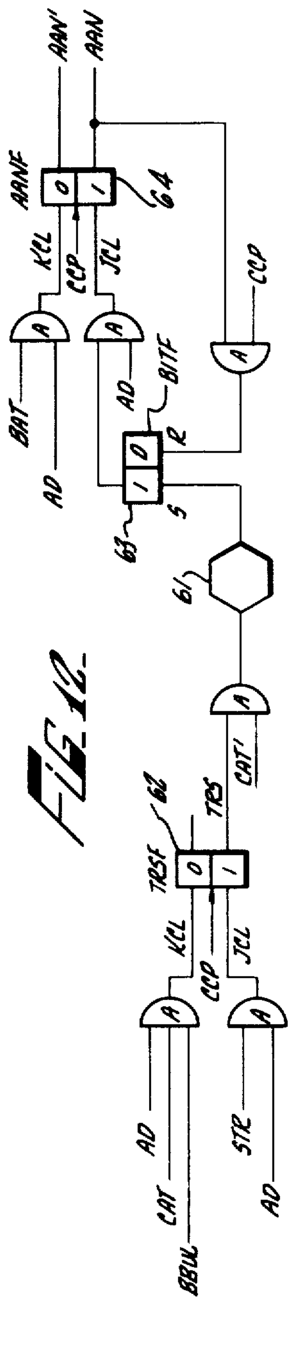

FIG. 12 depicts timing circuitry utilized by the adaptor. A precision multivibrator 61 shown in FIG. 12 produces output signals every 13.5 milliseconds when its input is "true." The multivibrator 61 is used to establish signals on line AAN whenever this adaptor needs attention. A multivibrator period of 13.5 milliseconds is shown as the period T in FIG. 11. Since when activated the multivibrator 61 will continually produce a signal at each T interval, the multivibrator 61 is commonly referred to as a pump. A transmit flip-flop 62 is set to the "one" condition by signals on the STR line and on the AD line. It is set to the "zero" condition by signals on the AD line, CAT line and BBUL line. A clock pulse is also required to switch this flip-flop from one state to the other. When in the "one" condition the flip-flop 62 provides a signal on the TRS line. The multivibrator pump 61 is activated by signals on the TRS line and on the CAT' line. Upon activation, the pump 61 provides its first signal a period of $T/2$ subsequent to its activation. This first pulse and a number of succeeding pulses are indicated in FIG. 11. The output signal from pump 61 sets a synchronizing bit flip-flop BITF 63 to the "one" condition and the output of this flip-flop, in conjunction with a signal on the AD line, set flip-flop 64 to the "one" condition. Flip-flop 64 is set to the "zero" condition by signals on the AD line and on the BAT line. Flip-flop 64, however, like flip-flop 62 and unlike flip-flop 63 requires in addition that a clock pulse be present in order to switch from one condition to the other. Flip-flop 64 being in the "one" condition, supplies a signal to line AAN while flip-flop 64 being in the "zero" condition supplies a signal to line AAN'. A signal on line AAN in turn resets flip-flop 63 to the "zero" condition at the next clock pulse time.

The signal on the line STR represents the transmit command received by the adaptor from the buffer control circuitry. Each pump signal from multivibrator 61 indicates that the adaptor is ready to place a bit on the line going from the adaptor to the peripheral unit located at a remote station. The request made by the adaptor for this bit to be sent to the remote station must by synchronized with the 100 kc. clock. The flip-flop 63 accomplishes this synchronization by setting flip-flop 64 in response to output signals from pump 61 but only in synchronism with the clock. The signal received from the buffer control circuitry on line BAT turns off the attention-needed flip-flop 64 since this signal indicates that bit access time has arrived. Bit access time occurs at varying time subsequent to the request for service indicated by the signal on line AAN so there is a varying service delay between the time of the request and the appearance of the signal on line BAT. This service delay is also indicated in FIG. 11.

Figures 13, 14:
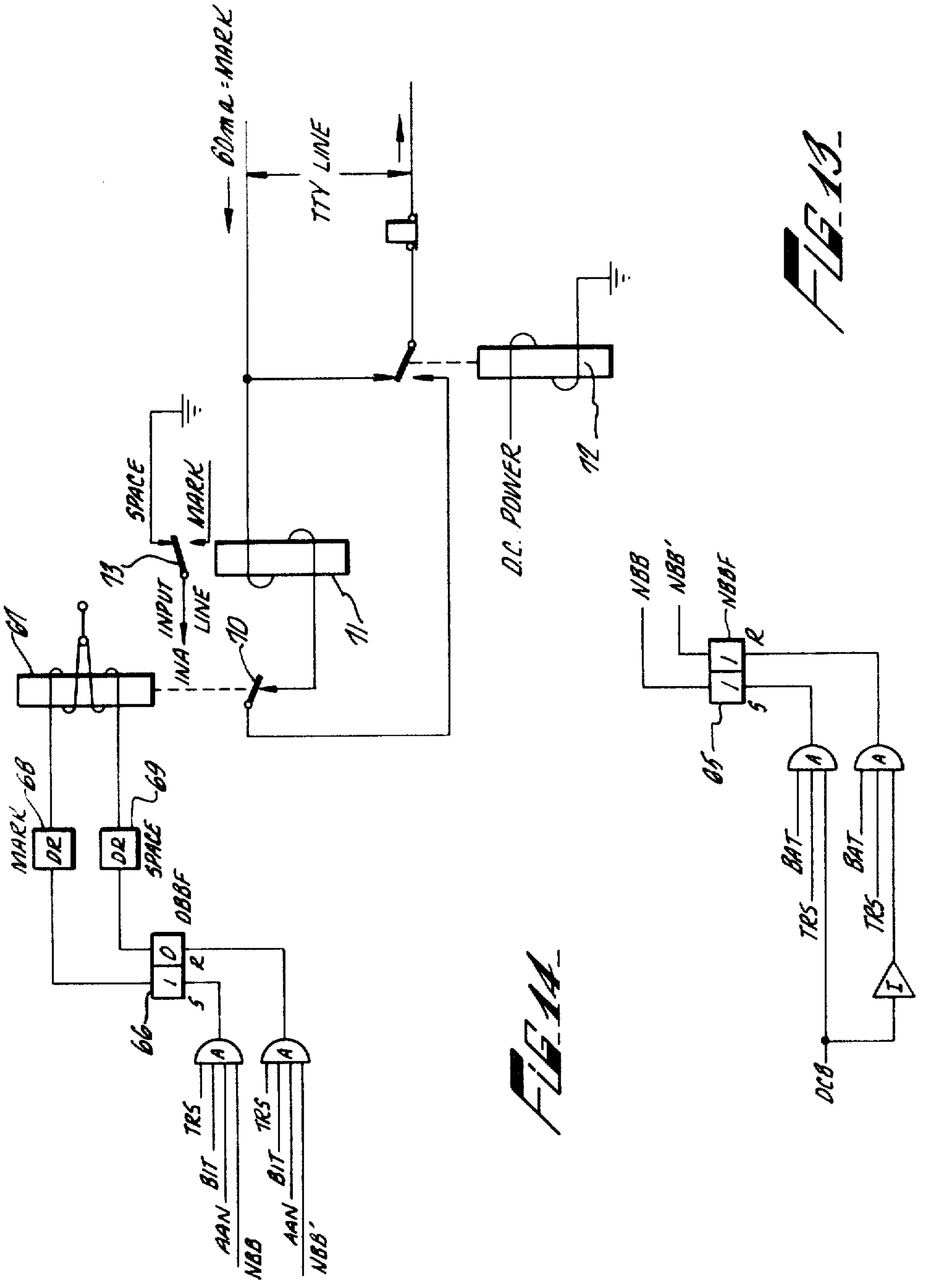

As shown in FIG. 13, the "next bit" flip-flop 65 is set in response to signals on the BAT line, TRS line and DC8 line, and is reset to the "zero" condition by signals on the BAT line, TRS line and DC8' line. Since the DC8 line and DC8' line indicate the value of a bit received from buffer memory during the output operation, the "next bit" flip-flop 65 will indicate the value of the bit received at this time on the lines DC8 and DC8'. The "next bit" flip-flop 65 provides temporary storage of bits received from buffer memory in order that they may be placed upon the line to the remote station at a uniform rate. This temporary storage is necessitated because of the service delays occurring between the time the request for service is made by the adaptor and the succeeding bit access time when a bit is received on line DC8 from the buffer. At every bit access time, the bit sent from the buffer has been received and is set into "next bit" flip-flop 65. This flip-flop therefore assumes the state of the bit received at every bit access time.

FIG. 14 depicts the manner in which bits received from the buffer are transferred to the line connecting the adaptor to the remote station. The information bit temporarily stored in flip-flop 65 is transferred to output buffer flip-flop 66 which then places the bit upon the line. The multivibrator pump 61 provides pulses at predetermined intervals in accordance with the output timing requirements of the peripheral unit to which the information is transmitted. The bit is therefore place into flip-flip 66 from flip-flop 65 in accordance with these output timing requirements. As a result of the output pulses provided by multivibrator 61 the bit stored in flip-flop 65 is therefore transferred to flip-flop 66 in response to signals on the TRS, BIT and AAN lines. The output lines from flip-flop 66 are utilized to actuate the coils of polarized relay 67 by means of driving circuits 68 and 69 which provide the necessary power to actuate these coils. A "one" condition stored in flip-flop 66 will therefore cause the relay contact 70 to be pushed down, closing this switch and enabling current to flow in the output line. Current flowing in the output line is indicative of a "one" stored in flip-flop 66. In conventional Teletype terminology, the flow of current in the output line is indicative of a "marking" condition while the absence of current flowing in this line is indicative of a "spacing" condition.

Relay 71 shown in FIG. 14 follows input signals received from the line and will be discussed in connection with the input operation of this adaptor. Relay 72 is a power interlock which shorts the line to insure continuity in the Teletype network when the adaptor is turned off.

When the buffer control circuitry has counted five information pulses which have been transmitted to the adaptor, it knows that for this particular adaptor it is now character time. The AD1, AD2, and AD4 lines discussed previously indicate to the buffer control circuitry the particular kind of adaptor it is dealing with and after how many bits it is to provide a character access time signal on the CAT line. Since the adaptor designed for the Model 28 Teletype unit must work with a code in which a character is made up of five information bits, a start bit and one and one-half stop bits, it will indicate to the buffer control that a CAT signal is to be provided after the transmission of every eight bits. The timing of the CAT signal will be different for various types of peripheral units and will occur, for example, after every ten bits when the buffer control circuitry is communicating with a dataspeed adaptor.

When the AAN line is made "true" by the adaptor during an output operation, the adaptor will first receive a start pulse which corresponds to a zero or a spacing level for the Teletype Model 28 unit, followed by a series of information pulses which in turn are followed by two stop pulses which in the Model 28 Teletype unit are two "l's" of marking levels. Subsequent to the first stop bit, a signal is applied to the BAT line which is followed immediately by a signal applied to the CAT line. As a result, the CAT signal is provided immediately after the BAT signal which brings the second stop bit into "next bit" flip-flop 65. The signal on the CAT line turns off the multivibrator pump 61 and the pump remains off for a period of ten microseconds, the duration of the CAT signal, and is then turned back on again. This causes the multivibrator pump to deliver its next pulse sooner than it otherwise would have, i.e., just a little bit more than $T/2$ after its previous pulse. This early pump pulse causes the attention-needed line AAN to again be set to the true level and causes the start bit of the next character being received from the buffer to be stored in the next bit flip-flop 65. The same request for access which causes the start bit of the next character to be stored in next bit flip-flop 65 also delivers the second stop bit of the preceding character onto the line.

The net result of the preceding is that the first stop bit is foreshortened to a period only slightly in excess of T/2 and the two stop bits are effectively both transmitted in only one and one-half bit times rather than necessitating two full bit times. Furthermore, the line adaptor immediately begins transmission of the next character as soon as it completes transmission of the previous character.

Figure 15:
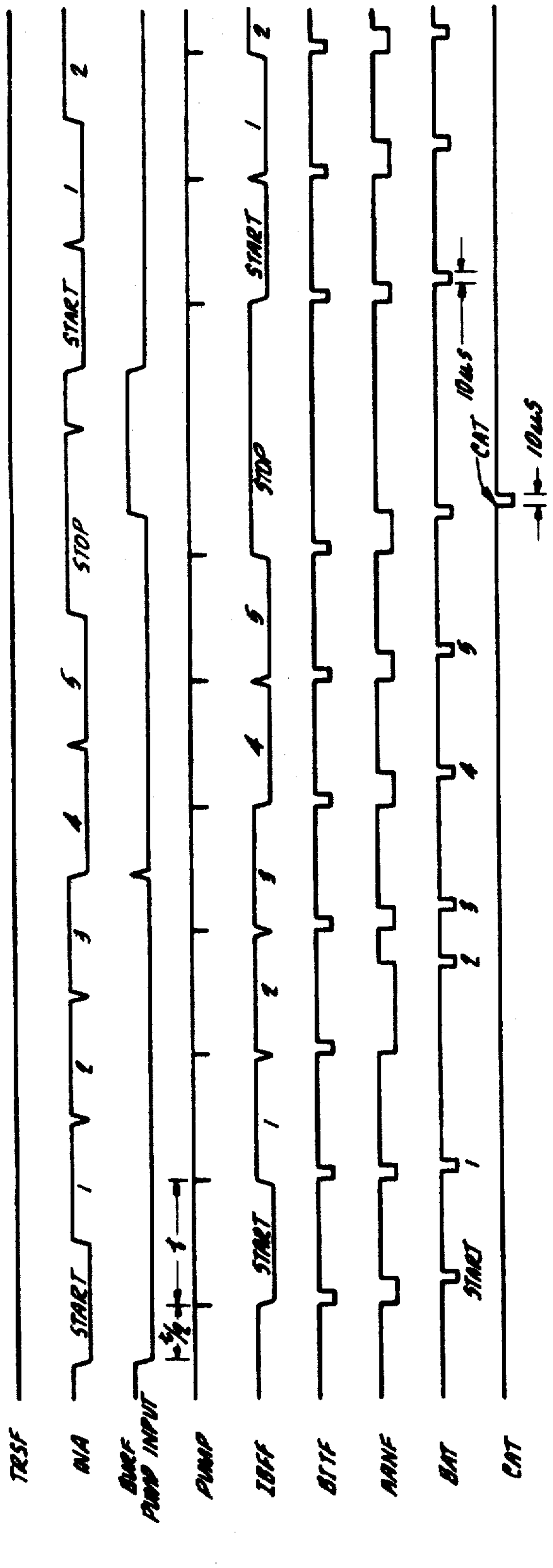

FIG. 15 depicts a timing diagram showing signals on a number of lines associated with the Teletype Model 28 line adaptor during an input operation wherein information characters are transmitted from the adaptor to the buffer memory.

FIG. 14 depicts the manner in which such input signals are received by the adaptor as well as the manner in which output signals are transmitted to the line. Relay 71 responds to input signals received on the line from the peripheral unit. Thus, when a current is present on the line, indicating a marking level or a "one," the relay causes contact 73 to close thereby establishing a "true" level of −4.5 volts on input line INA. Whenever current ceases to flow in the line, indicating a spacing level or a "zero," the relay 71 causes contact 73 to be connected to ground thereby establishing a "false" level on input line INA. Thus, the line INA will be in a "true" or "false" condition depending upon the nature of incoming bits of information from the peripheral unit.

Figures 16, 17:
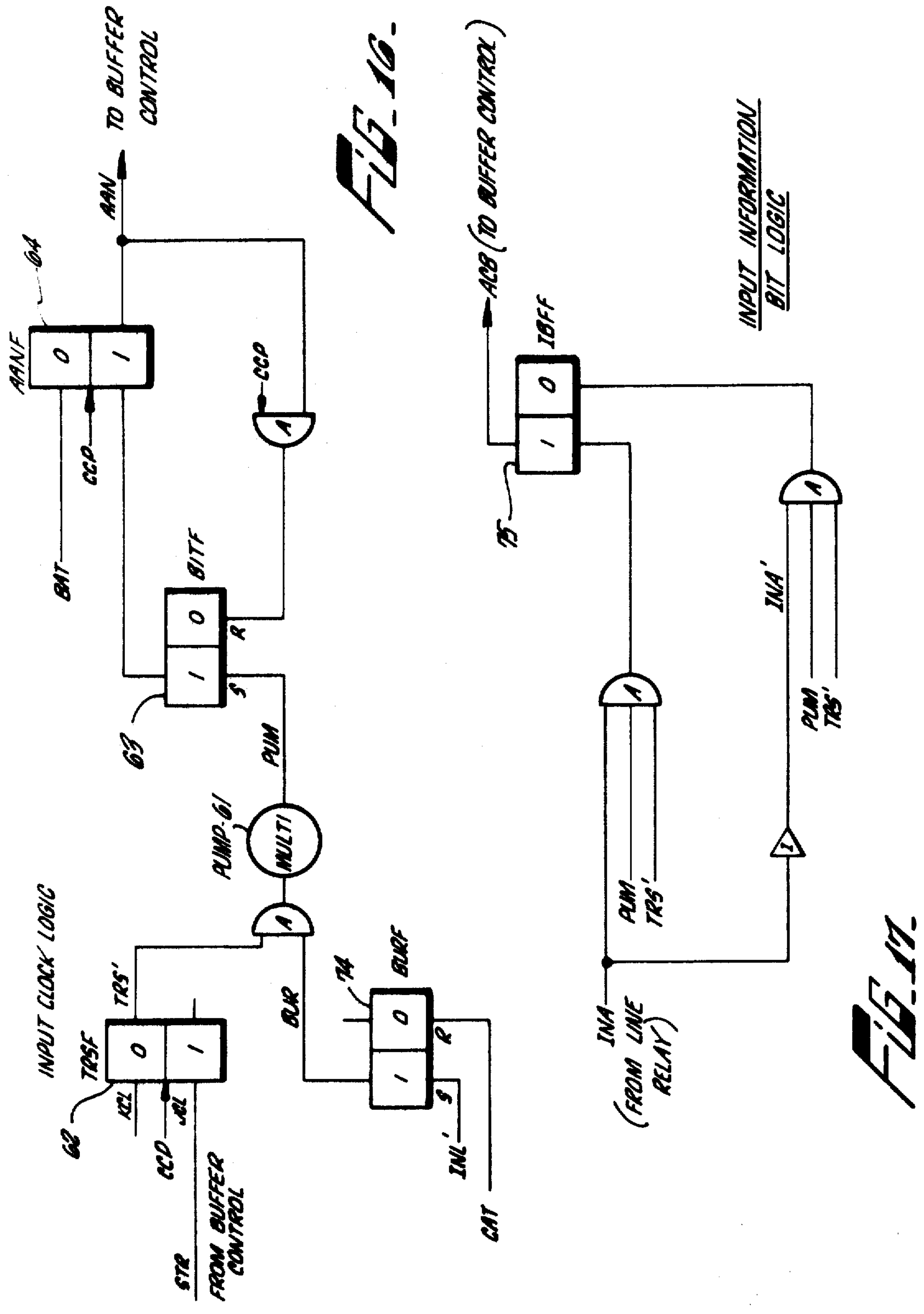

Input clock logic for the input operation is shown in FIG. 16 and is similar to the logic shown previously in FIG. 12. With the adaptor in the input condition, the transmit flip-flop 62 will store a "zero" and the TRS' line will be "true." With the adaptor in the input condition, the adaptor will look for a change in the logic level appearing on the INL and INL' lines which indicate the start of a character being received on the line. Thus, character flip-flop 74 will be set to the "1" condition by line INL' being in the "true" condition. Flip-flop 74 being in the "1" condition when the adapter is in the input state causes the multivibrator pump 61 to commence supplying output pulses at a time $T/2$ later. These signals are indicated in in FIG. 15. The bit flip-flop and attention-needed flip-flop 64 shown in FIG. 16 are set and reset in a manner identical to that described for these flip-flops in connection with the discussion of FIG. 12.

FIG. 17 depicts input information bit logic circuitry. Input buffer flip-flop 75 is set to the "1" condition by a signal from pump 61, a signal on line TRS' and a signal on input line INA. Input buffer flip-flop 75 is reset to the "zero" condition by a signal from multivibrator pump 61, a signal on line TRS' and a signal on line INA' from the line relay. The input bit flip-flop 75 presents input bits to the buffer control circuitry on lines AC8 and AC8'. When the adaptor asks for attention by establishing a "true" level on line AAN, shown in FIG. 16, a signal will be received from the buffer control circuitry on line BAT at varying times thereafter. Thus, in the input operation as well as in the output operation a service delay of varying length will exist between the time a "true" level is established on line AAN and the time a bit access time signal is returned to the adaptor from the buffer control circuitry on line BAT. During the ten microsecond bit access time, the memory cycle stores the contents of information bit flip-flop 75 into the buffer memory as described previously. When all of the bits of a character have been stored, a signal is applied to the CAT line from the buffer control circuitry indicative that character access time has arrived. At character access time, the input line INA will be in a marking condition and will remain in the marking condition until the next start pulse is received from the line. Upon receipt of the next start pulse, indicating that a succeeding character is being received from the line, this character will be received by the adaptor and transmitted to the buffer in a manner identical to that by which the previous character was sent to the buffer.

Figure 18:
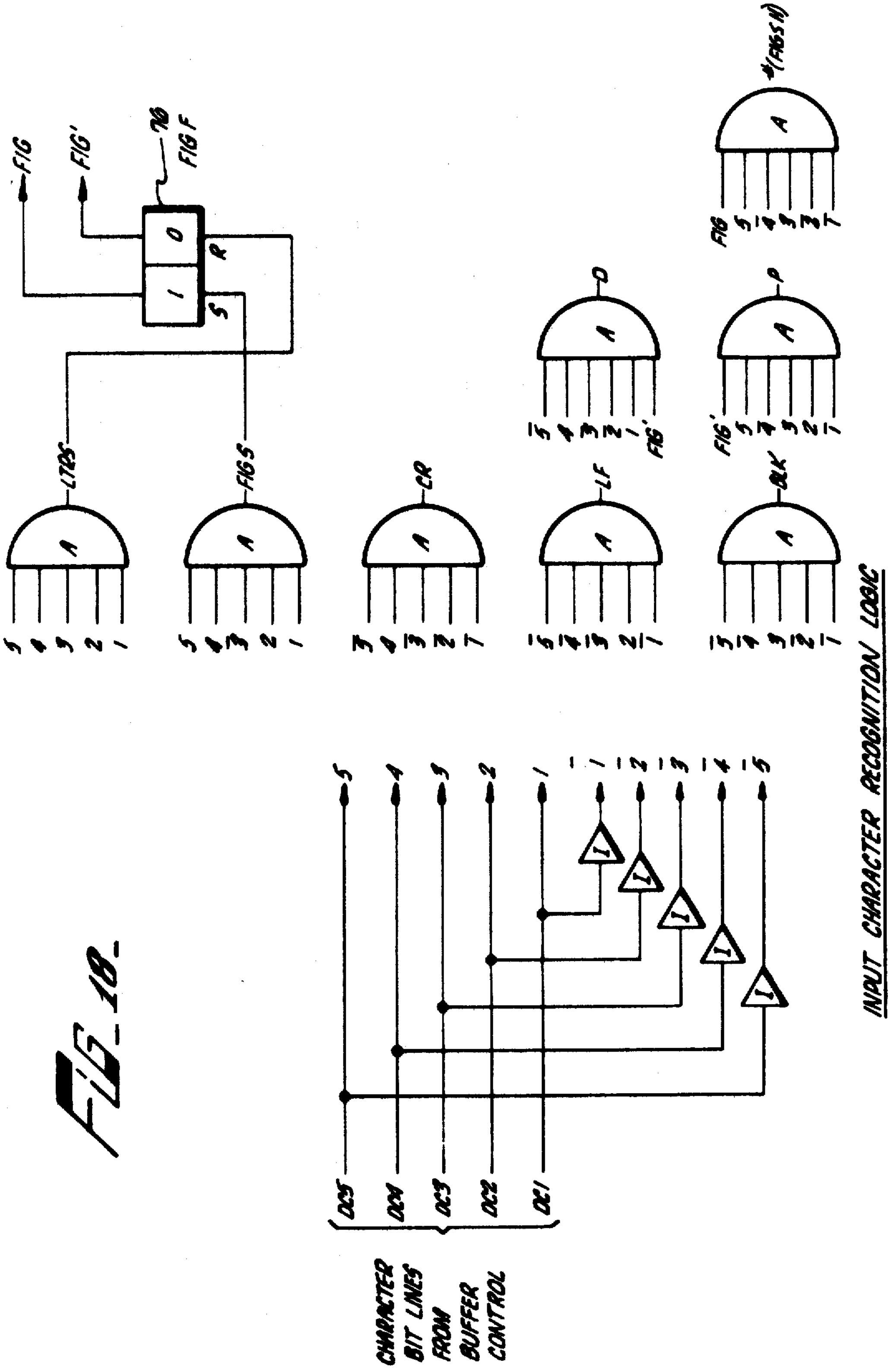

FIG. 18 indicates particular input character recognition logic by means of which circuitry within the Teletype Model 28 line adaptor is enabled to recognize particular characters received from the line. As discussed previously in connection with the description of the buffer control circuitry, each character assembled within the input/output control location of the buffer memory is transmitted to the adaptor over DC lines prior to its storage within address locations of the buffer. Lines DC1 through DC5 are shown in FIG. 18 and inversion switches are shown which produce lines having the opposite logic level from that on each of the lines DC1 through DC5. Signals received on these lines are gated by means of the AND gates shown in FIG. 18 to enable the line adaptor for the Model 28 Teletype unit to recognize particular input characters. Signals appearing on the lines DC1 through DC5 and their inserted complements display a valid character to the input character recognition logic circuitry at character access time. Thus, for example, "true" levels on the DC1, DC2, DC4 and DC5 lines and a "false" level on the DC3 line indicate that the code character for "figures" has been assembled in the input/output control location of the buffer memory. A signal is thereby established on the line FIGS which sets flip-flop 76 to the "one" condition. With flip-flop 76 in the "one" condition, the line FIG is established in the "true" condition. Figure flip-flop 76 being in the "one" condition sets the state of the adaptor to the "Figures" case. So long as the adaptor is in the "Figures" case, all subsequent characters will be interpreted as "Figures." To get out of the "Figures" case the adaptor must be set to the "Letters" case. The flip-flop 76 is reset to the zero condition in response to the lines DC1 through DC5 all being in the "true" condition at character access time. "True" levels on the lines DC1 through DC5 at character access time cause an AND gate to reset buffer 76 to the "zero" condition as shown in FIG. 18. With the adaptor in the "Letters" case, all subsequent characters will be interpreted as "Letters." For example, as shown in FIG. 18, the letter "D" is recognized at character access time by "true" levels on lines DC1 and DC4, "false" levels on lines DC2 and DC3, DC5, and flip-flop 76 being in the zero or "Letters" state. Similarly, the letter "P" is recognized at character access time by the lines DC1 and DC4 being in the "false" condition, the lines DC2, DC3 and DC5 being in the "true" condition and flip-flop 76 being in the zero or "Letters" state.

Other characters recognized by the Teletype Model 28 during the input operation are also shown in FIG. 18. Thus, DC lines 1, 2, 3, and 5 being "false" while DC line 4 is "true" indicates "carriage return." DC lines 1, 3, 4 and 5 being "false" with DC line 2 "true" indicates "line feed." DC lines 1, 2, 4 and 5 being "false" with DC line 3 "true" indicates "blank." DC lines 1, 2, and 4 being "false" with DC lines 3 and 5 being "true" and with flip-flop 76 being in the "one" condition indicates "Figures H." Recognition of the last mentioned character indicates that the letter "H" has been received while the adaptor is in the "Figures" case. Each of the preceding input characters has significance in teletype operations and must be recognized.

Figure 19:
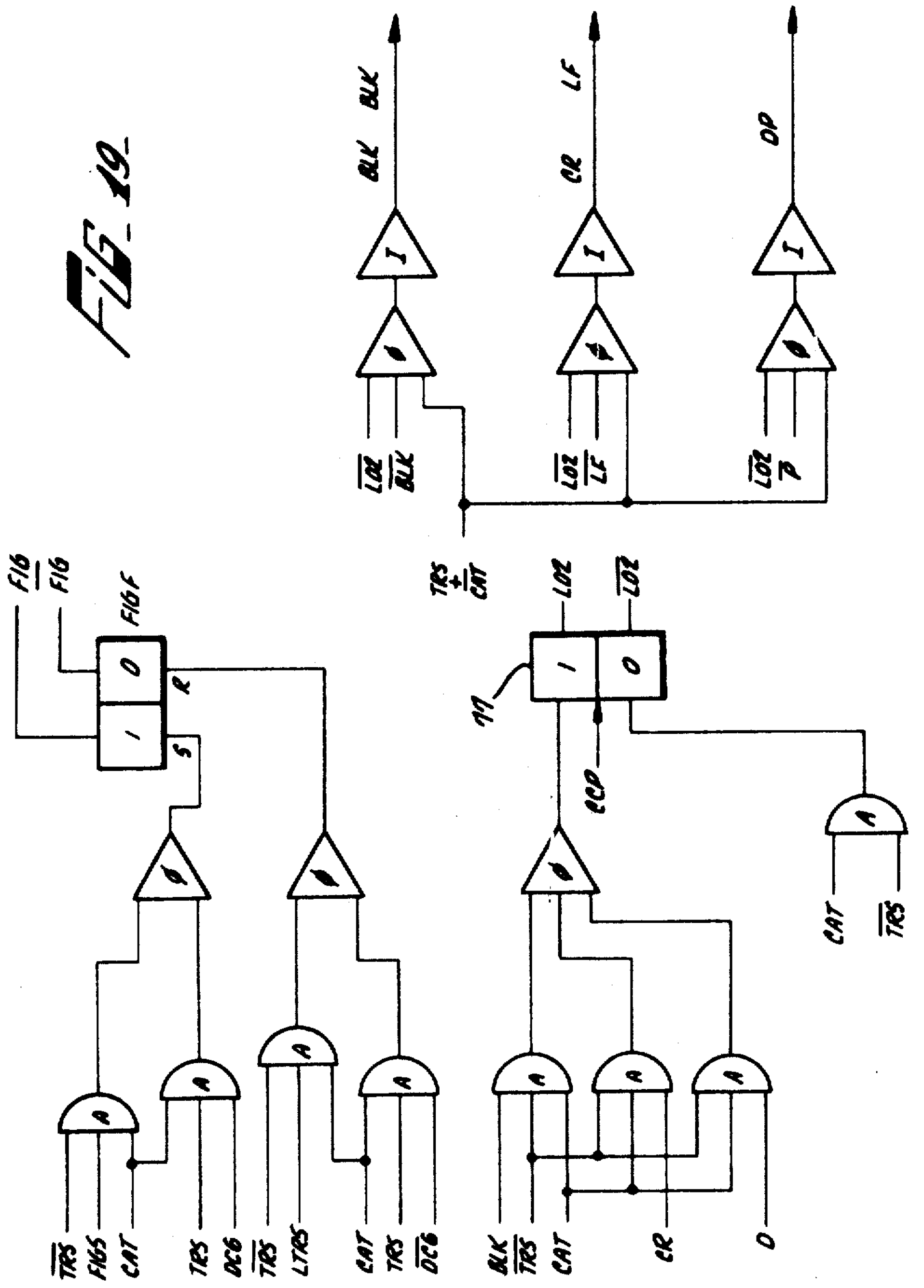

Additional multi-character input signals must also be recognized. Logic circuitry for recognizing such input multi-character control codes is depicted in FIG. 19. Thus, for example, the character "carriage return" followed by the character "line feed" indicates that the "end of address" is encountered in the data stream. At this point the adaptor must change its internal state. This character sequence is the marker between the address sequence which is not stored and the message proper which must be placed in the buffer memory. The means by which this sequence of characters is recognized is shown in FIG. 19. Recognition of the input character "carriage return" at character access time while the adaptor is in the input state sets flip-flop 77 to the "one" condition. With flip-flop 77 being in the "one" condition, if the "line feed" character is received at the next character access time, then the adaptor recognizes that it must change its state. Since two characters are used to indicate the "end of address" control character, it is necessary that the first character be remembered until it is determined whether the succeeding character is that character requiring such a change in the adaptor state.

Other multi-character signals which must be recognized on input by the adaptor are the character "D" followed by the character "P" and the character "blank" followed by the character "blank." Thus, the first character of each of these multi-character signals will also set flip-flop 77 to the "one" condition as shown in FIG. 19 and the appearance of any of the second characters of these multi-character signals while flip-flop 77 is in the "one" condition will place signals on lines indicating that the multi-character signal "blank blank," "carriage return line feed," or "DP" has occurred.

The adaptor must be able to recognize characters during the output operation as well as during the input operation. Thus, during the output operation when the data processor has loaded the buffer memory and the last character loaded was a group mark, the adaptor must be able to recognize the group mark to detect that the last data character has been transmitted on the line. When the group mark is encountered, the adaptor sends a signal to the buffer control circuitry which indicates that the group mark has been recognized.

Figure 20:
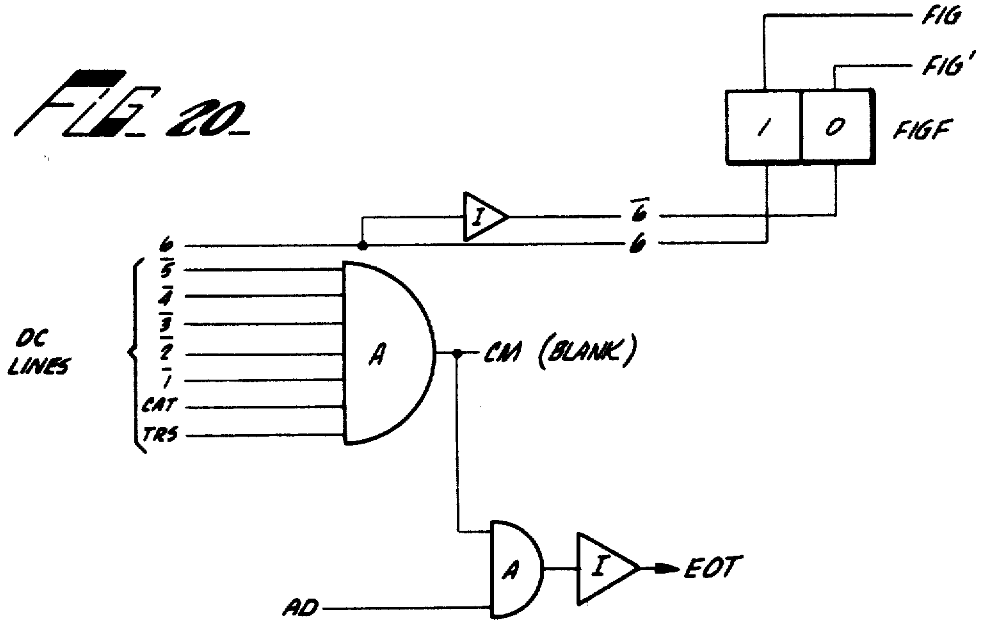

FIG. 20 depicts logical circuitry for recognizing the group mark. The last character received from the data processor and stored in the buffer is accessed by the adaptor as has been discussed previously. A gate recognizes the code for the "group mark" which is gated with lines CAT, TRS and AD, and an output signal then appears on the EOT line sent to the buffer control circuitry indicating to the buffer control circuit that the "end of output" has been recognized.

During the input operation the "end of input" character is "blank blank" and the adaptor must therefore look at two sequential characters on input. As shown in FIG. 19, when a first "blank" is encountered, flip-flop 77 is set to the one condition and when a second "blank" is encountered as the next character, a group mark is placed in the buffer memory and the "end of input recognized" line is established in the "true" condition and this signal is transmitted to the buffer control circuitry. The flip-flop 77 is always turned off at the next character access time after having been turned on if a "blank," "line feed," or "P" character was not received as the next character succeeding the character which had turned this flip-flop on.

Figure 21:
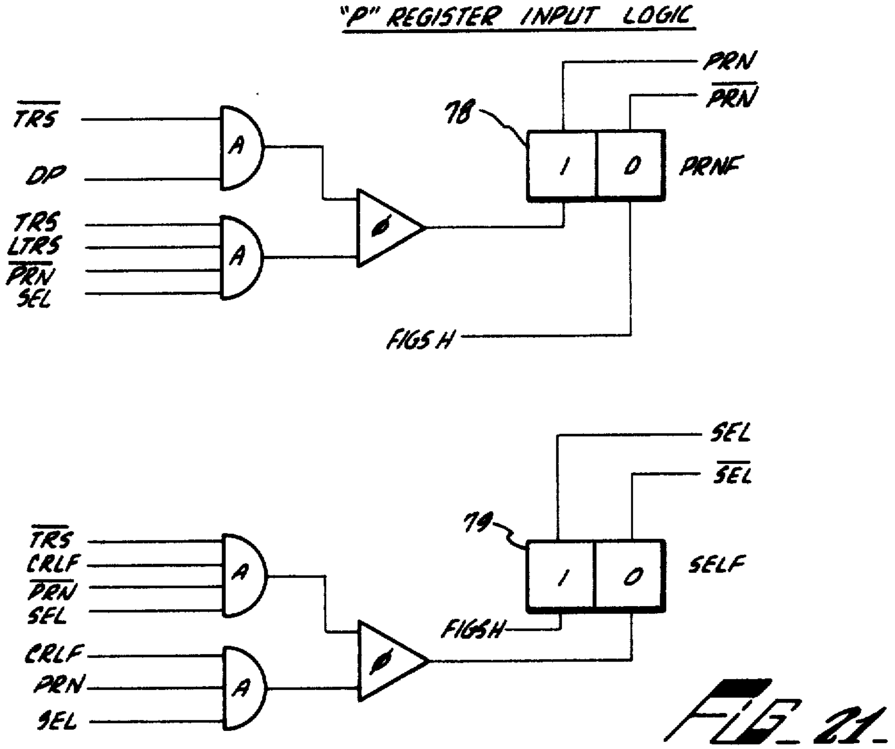

FIG. 21 depicts "print" flip-flop 78 and "select" flip-flop 79. Four internal states of the Teletype Model 28 line adaptor are designated by the states of these two flip-flops. The adaptor moves from one state to another in accordance with signals received from the line during an input operation or from the buffer memory during an output operation. For example, if the adaptor was in the "non-print," "select" state and encountered a "D P" multi-character signal, it would then go into the "print" "select" state.

As another example, if the adaptor is in the output state and encounters the "Letters character" while in the "non-print" "select" condition, the print flip-flop 78 will be set and the adaptor will go to the "print" "select" state. These internal states of the Model 28 line adaptor correspond to conventional states assumed by Model 28 Teletype units.

Figure 23:
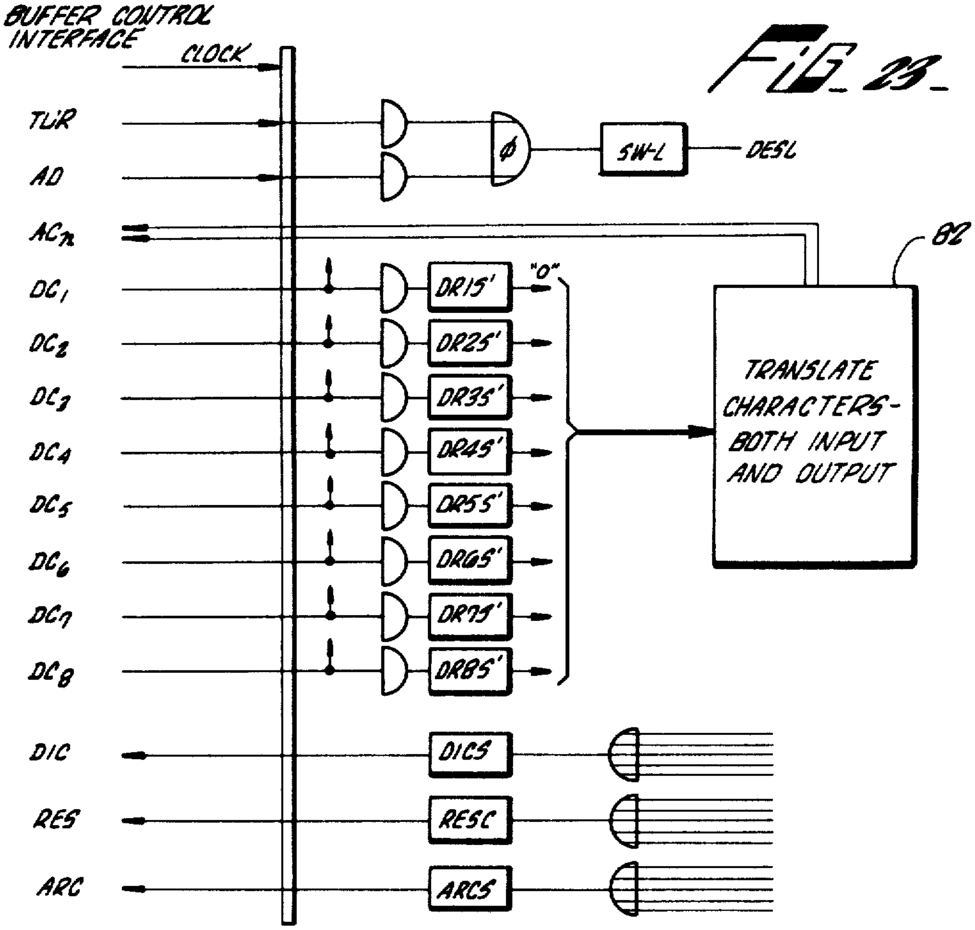
Figure 22:
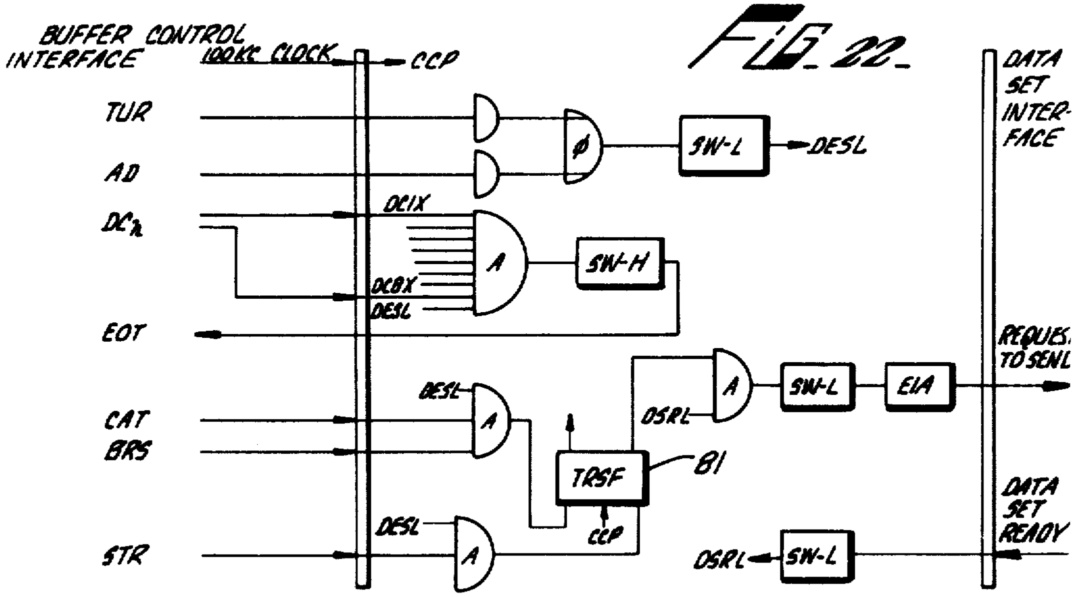

FIGS. 22 and 23 depict portions of the logical circuitry within an exemplary line adaptor designed to render peripheral units of the dataspeed type compatible with the buffer control circuitry and buffer memory previously described. Dataspeed units are available from the telephone company and may transmit and receive information over telephone lines. At each end of the telephone lines joining one or more dataspeed units located at a remote station to the line adaptor will be data sets such as Model 202C and 202D, also available from the telephone company.

Operation of the dataspeed line adaptor is very similar to the operation of the Teletype Model 28 adaptor previously described. Thus, the dataspeed adaptor will contain synchronizing control circuitry almost identical to that shown in FIGS. 12 and 16 for the Teletype Model 28 adaptor. The multivibrator pump used in the dataspeed adaptor will, however, produce signals at somewhat different intervals than were produced by the multivibrator pump described in connection with the Teletype Model 28 adaptor. This results since the intervals at which the multivibrator produces output pulses is governed by the particular type of peripheral unit to which the adaptor is transmitting bits or from which it is receiving bits. Thus, the rate at which the dataspeed units transmit or receive bits will be somewhat different from the corresponding rate for the Teletype Model 28 and the intervals between pulses provided by the precision multivibrator will be adjusted accordingly.

The dataspeed line adaptor will also contain circuitry similar to that shown in FIG. 17 for transmitting input bits to the buffer control circuitry, and will contain an output bit flip-flop such as that shown in FIG. 14 which is set and reset as is the flip-flop 66 of FIG. 14 and used for controlling the transmittal of output bits from the adaptor to a data set and thence via telephone lines to another data set and the designated dataspeed unit.

FIG. 22 depicts several of the lines at the interface between the buffer control circuitry and the dataspeed line adaptor and several lines at the interface between the dataspeed line adaptor and its associated data set. The lines shown at the interface between the buffer control circuitry and dataspeed line adaptor are a portion of the lines which make up the uniform interface between the buffer control circuitry and each of the line adaptors with which it is associated.

FIG. 22 depicts circuitry utilized during the transmission of output information from the buffer control circuitry to the data set. This output transmission is ended by recognition of the particular "end of transmission" character received on the DC lines. A gate shown in FIG. 22 is provided for the recognition of this character and together with a switch provides a signal upon the EOT line whenever this character is recognized. Other gates and a switch provide a signal on designate line DESL whenever signals appear on the AD line and on the TUR line. Transmission of output information is begun as a result of a signal appearing on the STR line which is anded with the DESL line to set flip-flop 81 to the "one" condition at the succeeding clock time. The signal provided by flip-flop 81 when in the "one" condition is anded with a signal appearing on the data ready line DSRL, the anded output passing via a switch and an EIA level changer to a request to send line which is sent to the data set. When the data set is ready, it provides a positive voltage "on" signal which passes via a switch to the DSRL line. The flip-flop 81 is reset to the zero condition by a signal upon the CAT line and the BRS line. The BRS line will be true whenever an end of transmission character has been recognized just before it was sent to the peripheral unit. As a result, after having reecived the "end of transmission" character, the adaptor will be informed by the signal on the BRS line that the buffer is busy when it again signals that attention is needed, after having received the end of transmission character.

FIG. 23 depicts particular additional logical circuitry within the data speed line adaptor. Translation circuitry 82 translates particular characters seen by the adaptor on the DC lines both during input and output operations. Circuitry 82 will include gating circuitry, a portion of which is indicated in FIG. 23, by which particular characters received on the DC lines will be recognized and in response thereto particular lines will be established in a "true" condition. Thus, recognition by translation circuitry 82 of a character which should be discarded will establish a true level on line DIC, recognition of the character indicating that the buffer address should be reset will establish a true level on line RES, and recognition of the character which should be replaced by another character will establish a true level on line ARC. In response to recognition of a character which should be replaced, the translation circuitry 82 will provide the replacement character on the AC lines and the buffer control circuitry will substitute this character for the replaced character as described during the discussion of the buffer control circuitry.

What has been described is considered to be only an illustrative embodiment of the present invention. Accordingly, it is to be understood that various and numerous other arrangements may be devised by one skilled in the art without departing from the spirit and scope of this invention.

What is claimed is:

1. In a data transmission system in which a data processor communicates with a plurality of peripheral units of varying types, a data transmission terminal unit comprising:

a buffer memory;

the buffer memory being divided into a plurality of identical segments;

a line adaptor associated with each of the peripheral units;

each of the buffer memory segments being associated with a particular one of the line adaptors; and buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor.

2. In a data transmission system in which a data processor communicates with a plurality of peripheral units of varying types, a data transmission terminal unit comprising:

a buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor;

one line of each uniform interface being an attention-needed line;

each line adaptor establishing a signal on its attention-needed line whenever its associated peripheral unit needs attention from its associated buffer segment;

priority circuitry for selecting one of the attention-needed lines according to a predetermined pattern whenever more than one of these lines signal that their associated adaptors need attention;

encoding means coupled to the priority circuitry for providing a combination of electrical signals indicative of the line adaptor associated with the selected attention-needed line;

selection register means responsive to the electrical signals provided by the encoding means for storing a value representative of the line adaptor associated with the selected peripheral unit; and means including the selection register means for connecting the peripheral unit associated with the selected line adaptor to its associated buffer segment.

3. In a data transmission system in which a data processor communicates with a plurality of peripheral units of varying types, a data transmission terminal unit according to claim 2 further comprising:

one line of each uniform interface being an adaptor-designate line; and decoding means coupled to the selection register means for providing a signal on that one adaptor-designate line associated with the line adaptor the value representative of which is stored in the selection register means; the signal appearing on its associated adaptor-designate line indicating to an adaptor that it has been selected.

4. In a data transmission system in which a data processor communicates with a plurality of peripheral units of varying types, a data transmission terminal unit according to claim 3 further comprising:

a plurality of lines of each uniform interface being adaptor-description lines;

selection circuitry responsive to signals upon the adaptor-description lines from each adaptor and to the signal upon the adaptor-designate line associated with the selected adaptor for providing signals indicative of the type of peripheral unit associated with the selected adaptor.

5. In a data transmission system in which a data processor communicates with a plurality of peripheral units of varying types, a data transmission terminal unit according to claim 4 further comprising:

one line of each uniform interface being an input-bit line;

means including the adaptor-designate line associated with the selected peripheral unit for enabling the selected peripheral unit to transmit input bits to its associated buffer segment via the input-bit line associated with the selected adaptor;

means for accumulating an input character within an input-output control section of the buffer segment; and means for storing the accumulated character within a predetermined location in the buffer segment.

6. In a data transmission system in which a data processor communicates with a plurality of peripheral units of varying types, a data transmission terminal unit according to claim 5, further comprising:

a plurality of lines of each uniform interface being stored-character lines;

means for providing signals on the stored-character lines associated with the selected adaptor indicative of the accumulated character stored within the input-output control section of the buffer segment; and recognition circuitry within each of the line adaptors for recognizing particular combinations of signals on the stored-character lines which are representative of particular characters accumulated within the input-output control section of the buffer segment.

7. In a data transmission system in which a data processor communicates with a plurality of peripheral units of varying types, a data transmission terminal unit according to claim 6 in which the recognition circuitry is capable of recognizing a particular character indicating that the end of an input message has been reached.

8. In a data transmission system in which a data processor communicates with a plurality of peripheral units of varying types, a data transmission terminal unit according to claim 6 in which the recognition circuitry is capable of recognizing a particular first group of characters and further comprising:

a line of each uniform interface being a discard line;

means for applying a signal to the discard line associated with the selected adaptor whenever the recognition circuitry recognizes one of the first group of characters stored in the input-output control section of the buffer segment; and means responsive to the signal appearing on the discard line for preventing the storage of the accumulated character within the predetermined location in the buffer segment.

9. In a data transmission system in which a data processor communicates with a plurality of peripheral units of varying types, a data transmission terminal units according to claim 8 in which the recognition circuitry is capable of recognzing a particular second group of characters and further comprising:

a line of each uniform interface being an adaptor-replace-character line;

a plurality of lines of each uniform interface being replacement character lines;

means for applying a signal to the adaptor-replace-character line associated with the selected adaptor whenever the recognition circuitry recognizes one of the second group of characters stored in the input-output control section of the buffer segments;

means for applying signals indicative of a replacement character on the replacement character lines; and means resopnsive to the signal on the adaptor-replace-character line for replacing the recognized character with the replacement character.

10. In a data transmission system in which a data processor communicates with a plurality of peripheral units of varying types, a data transmission terminal unit comprising:

a buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor;

one line of each uniform interface being an attention-needed line;

each line adaptor establishing a signal on its attention-needed line whenever its associated peripheral unit needs attention from the buffer memory;

priority circuitry for selecting that one of the attention-needed lines which is the first one of these lines to signal that its associated adaptor needs attention;

encoding means coupled to the priority circuitry for providing a combination of electrical signals indicative of the line adaptor associated with the selected attention-needed line;

one line of each uniform interface being a first buffer-segment-select line;

selection register means responsive to the electrical signals provided by the encoding means for storing a value representative of a first buffer segment associated with the selected adaptor in the absence of a signal upon the first buffer segment-select line and for storing a value representative of a second buffer segment associated with the selected adaptor in the presence of a signal upon the first buffer segment-select line; and means including the selection register means for connecting the peripheral unit associated with the selected line adaptor to that buffer segment, the value representative of which is stored in the selection register means.

11. In a data transmission system in which a data processor communicates with a plurality of peripheral units of varying types, a data transmission terminal unit according to claim 10 further comprising:

one line of each uniform interface being a second buffer segment-select line;

the selection register means responsive to the electrical signals provided by the encoding means storing a value representative of a third buffer segment associated with the selected adaptor in the presence of a signal upon the second buffer segment-select line.

12. In a data transmission system in which a data processor communicates with a plurality of peripheral units of varying types, a data transmission terminal unit according to claim 11 in which all of the buffer memory segments are of the same size.

13. In a data transmission system in which a data processor communicates with a plurality of peripheral units of varying types, a data transmission terminal unit comprising:

a magnetic core buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor;

one line of each uniform interface being an attention-needed line;

each line adaptor establishing a signal upon the attention-needed line whenever its associated peripheral unit needs attention from the buffer memory;

priority circuitry for selecting that one of the attention-needed lines which is the first one of these lines to signal that its associated adaptor needs attention;

encoding means coupled to the priority circuitry for providing a combination of electrical signals indicative of the line adaptor associated with the selected attention-needed line;

selection register means responsive to the electrical signals provided by the encoding means for storing a value representative of a particular buffer segment associated with the selected adaptor;

means including the selection register means for connecting the peripheral unit associated with the selected line adaptor to the particular buffer segment the value representative of which is stored in the selection register means;

means for removing an output character from a predetermined location within the particular buffer segment and storing it within an input-output control section of the particular segment;

one line of each uniform interface being an output-bit line;

means for enabling the selected peripheral unit to receive output bits on its associated output-bit line; and means for transmitting the output character stored in the input-output control section of the particular buffer segment to the selected peripheral unit a bit at a time over the output bit line associated with the selected peripheral unit.

14. In a data transmission system in which a data processor communicates with a plurality of peripheral units of varying types, a data transmission terminal unit according to claim 13 further comprising:

a plurality of lines of each uniform interface being stored-character lines;

means for providing signals on the stored-character lines associated with the selected adaptor indicative of the output character stored within the input-output control section of the particular buffer segment; and recognition circuitry within each of the line adaptors for recognizing particular combinations of signals on the stored-character lines which are representative of particular output characters stored within the input-output control section of the particular buffer segment.

15. In a data transmission system in which a data processor communicates with a plurality of peripheral units of varying types, a data transmission terminal unit according to claim 14 in which the recognition circuitry is capable of recognizing a particular output character indicating that the end of an output message has been reached.

16. In a data transmission system in which a data processor communicates with a plurality of peripheral units of varying types, a data transmission terminal unit comprising:

a buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory:

the buffer control means being electrically connected to each of the line adaptors by a plurality of signal lines and presenting a uniform pattern of lines to each adaptor whereby a uniform interface is established between the buffer control means and each adaptor;

selection register means for storing a value representative of a particular buffer segment;

means including the selection register means for connecting that particular buffer segment, the value representative of which is stored in the selection register means, to its associated line adaptor;

information lines connected from the data processor to the data transmission terminal unit;

a control line connected from the data processor to the data transmission terminal unit; and means responsive to a signal on the control line and to signals on the information lines for storing a particular value in the selection register.

17. In a data transmission system in which a data processor communicates with a plurality of peripheral units of varying types, a data transmission terminal unit according to claim 16 further comprising:

one line of each uniform interface being an attention-needed line;

each line adaptor establishing a signal upon its attention-needed line whenever its associated peripheral unit needs attention from the buffer memory;

priority circuitry for selecting that one of the attention-needed lines which is the first one of these lines to signal that its associated adaptor needs attention;

encoding means coupled to the priority circuitry for providing a combination of electrical signals indicative of the line adaptor associated with the selected attention-needed line;

a temporary storage register; and means responsive to the electrical signals provided by the encoding means for storing in the selection register a value representative of a particular buffer segment associated with the selected adaptor and for transferring to the temporary storage register the value previously stored in the selection register.

18. In a data transmission system in which a data processor communicates with a plurality of peripheral units of varying types, a data transmission terminal unit comprising:

a magnetic core buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor;

one line of each uniform interface being an attention-needed line;

each line adaptor establishing a signal upon its attention-needed line whenever its associated peripheral unit needs attention from the buffer memory;

priority circuitry for selecting that one of the attention-needed lines which is the first one of these lines to signal that its associated adaptor needs attention;

encoding means coupled to the priority circuitry for providing a combination of electrical signals indicative of the line adaptor associated with the selected attention-needed line;

selection register means responsive to the electrical signals provided by the encoding means for storing a value representative of a particular buffer segment associated with the selected adaptor;

means including the selection register means for connecting the peripheral unit associated with the selected line adaptor to the particular buffer segment the value representative of which is stored in the selection register means;

means for removing an output character from a predetermined location within the particular buffer segment and storing it within an input/output control section of the particular segment;

one line of each uniform interface being an output-bit line;

means for transmitting the output character stored in the input/output control section of the particular buffer segment a bit at a time to a bistable storage device within the selected adaptor over the output-bit line associated with the selected adaptor and in response to signals appearing on the selected attention-needed line;

the selected line adaptor including a precision multivibrator circuit for providing output pulses at a rate compatible with the output-bit reception rate of the peripheral unit associated with the selected adaptor;

means respective to output pulses from the multivibrator for providing signals upon the selected attention-needed line; and means responsive to signals upon the selected attention-needed line for providing to the selected peripheral unit the bit stored in the bistable storage device within the selected adaptor.

19. In a data transmission system in which a data processor communicates with a plurality of peripheral units of varying types, a data transmission terminal unit comprising:

a magnetic core buffer memory;

the buffer memory being divided into a plurality of segments;

a line adaptor associated with each of the peripheral units;

each of the buffer memory segments being associated with a particular one of the line adaptors;

buffer control means for controlling the transmission of information between the line adaptors and their associated segments of the buffer memory;

the buffer control means being electrically connected to each of the line adaptors by a plurality of signal lines and presenting a uniform pattern of lines to each adaptor whereby a uniform interface is established between the buffer control means and each adaptor;

one line of each uniform interface being an attention-needed line;

each line adaptor establishing a signal upon its attention-needed line whenever its associated peripheral unit needs attention from the buffer memory;

priority circuitry for selecting that one of the attention-needed lines which is the first one of these lines to signal that its associated adaptor needs attention;

encoding means coupled to the priority circuitry for providing a combination of electrical signals indicative of the line adaptor associated with the selected attention-needed line;

selection register means responsive to the electrical signals provided by the encoding means for storing a value representative of a particular buffer segment associated with the selected adaptor;

means including the selection register means for connecting the peripheral unit associated with the selected line adaptor to the particular buffer segment the value representative of which is stored in the selection register means;

one line of each uniform interface being an input-bit line;

the selected line adaptor including a precision multivibrator circuit for providing output pulses at a rate compatible with the input-bit transmission rate of the peripheral unit associated with the selected adaptor;

means responsive to output pulses from the multivibrator for providing signals upon the selected attention-needed line; and means responsive to output pulses from the multivibrator for providing to the input-bit line associated with the selected adaptor an input-bit received from the peripheral unit associated with the selected adaptor.

References Cited

UNITED STATES PATENTS

| | | | |
|---|---|---|---|
| 3,312,950 | 4/1967 | Hillman et al. | 340—172.5 |
| 3,312,945 | 4/1967 | Berezin et al. | 340—172.5 |
| 3,305,839 | 2/1967 | Looschen et al. | 340—172.5 |
| 3,303,475 | 2/1967 | Hellerman et al. | 340—172.5 |
| 3,095,553 | 6/1963 | Hill et al. | 340—172.5 |
| 3,029,414 | 4/1962 | Schrimpf | 340—172.5 |

ROBERT C. BAILEY, *Primary Examiner.*

G. D. SHAW, *Assistant Examiner.*